US012459701B2

(12) United States Patent
Hirano

(10) Patent No.: US 12,459,701 B2
(45) Date of Patent: Nov. 4, 2025

(54) ARTICLE TRANSPORTATION PALLET

(71) Applicant: Kazutoyo Hirano, Wakayama (JP)

(72) Inventor: Kazutoyo Hirano, Wakayama (JP)

( * ) Notice: Subject to any disclaimer, the term of this patent is extended or adjusted under 35 U.S.C. 154(b) by 30 days.

(21) Appl. No.: 18/262,449

(22) PCT Filed: Nov. 12, 2021

(86) PCT No.: PCT/JP2021/041695
§ 371 (c)(1),
(2) Date: Jul. 21, 2023

(87) PCT Pub. No.: WO2022/158093
PCT Pub. Date: Jul. 28, 2022

(65) Prior Publication Data

US 2024/0076100 A1  Mar. 7, 2024

(30) Foreign Application Priority Data

Jan. 22, 2021 (JP) ................................ 2021-008451

(51) Int. Cl.
*B65D 19/00* (2006.01)
(52) U.S. Cl.
CPC ................ *B65D 19/0095* (2013.01); *B65D 2519/00019* (2013.01); *B65D 2519/00024* (2013.01);
(Continued)
(58) Field of Classification Search
CPC ...... B65D 19/0095; B65D 2519/00019; B65D 2519/00024; B65D 2519/00034;
(Continued)

(56) References Cited

U.S. PATENT DOCUMENTS 2,925,947 A * 2/1960 Brown ............... B65D 19/0012
229/120.31
3,273,518 A * 9/1966 Shina ................. B65D 19/0016
108/51.3
(Continued)

FOREIGN PATENT DOCUMENTS

EP 4282770 A1 * 11/2023 ......... B65D 19/0093
FR 2775662 A1 9/1999
(Continued)

*Primary Examiner* — Jose V Chen
(74) *Attorney, Agent, or Firm* — Bookoff McAndrews, PLLC

(57) ABSTRACT

[Object] To provide an article transportation pallet which does not take up much space during storage or transportation and can normally load and transport articles during use.
[Solution Means] The article transportation pallet includes a foldable pallet body 4 having a first surface structure in which a plurality of first plate bodies 2 formed in a strip shape are arranged so as to be parallel to each other in a plane direction and a second surface structure in which a plurality of second plate bodies 3 formed in a strip shape are arranged so as to be parallel to each other in a plane direction, where the plurality of first plate bodies 2 and the plurality of second plate bodies 3 are arranged so that the plurality of second plate bodies 3 intersect with the plurality of first plate bodies 2 to constitute quadrilateral regions S, each surrounded by four wall surfaces composed of two of the first plate bodies and two of the second plate bodies, and the first and second plate bodies 2, 3 are rotatably connected at intersection lines of the first and second plate bodies 2, 3, and when the pallet body 4 is expanded into a use state, a box 15 is accommodated in the quadrilateral region S in order to hold the expanded state.

13 Claims, 18 Drawing Sheets

(52) U.S. Cl.
CPC .............. *B65D 2519/00034* (2013.01); *B65D 2519/00054* (2013.01); *B65D 2519/00059* (2013.01); *B65D 2519/00069* (2013.01); *B65D 2519/00273* (2013.01); *B65D 2519/00278* (2013.01); *B65D 2519/00293* (2013.01); *B65D 2519/00303* (2013.01); *B65D 2519/00323* (2013.01); *B65D 2519/00358* (2013.01); *B65D 2519/00567* (2013.01); *B65D 2519/0087* (2013.01)

(58) Field of Classification Search
CPC ........... B65D 2519/00054; B65D 2519/00059; B65D 2519/00069; B65D 2519/00273; B65D 2519/00278; B65D 2519/00293; B65D 2519/00303; B65D 2519/00323; B65D 2519/00358; B65D 2519/00567; B65D 2519/0087
USPC ........................................................ 108/51.3
See application file for complete search history.

(56) References Cited

U.S. PATENT DOCUMENTS

| | | | | |
|---|---|---|---|---|
| 3,469,542 A * | 9/1969 | Ahlenius | ............ | B65D 19/0071 108/56.1 |
| 3,704,673 A * | 12/1972 | Drelicharz | ......... | B65D 71/0096 108/57.1 |
| 3,752,089 A * | 8/1973 | Bartels | ...................... | E04H 3/24 428/116 |
| 3,831,503 A * | 8/1974 | Tranquillitsky | ....... | B65D 19/38 428/542.2 |
| 5,184,558 A * | 2/1993 | Wozniacki | ......... | B65D 19/0028 493/356 |
| 5,337,679 A * | 8/1994 | Moorman | .......... | B65D 19/0026 108/51.3 |
| 5,357,875 A * | 10/1994 | Winebarger | ....... | B65D 19/0024 108/51.3 |
| 5,429,236 A | 7/1995 | Evans | | |
| 5,461,988 A * | 10/1995 | Cummings | ........ | B65D 19/0075 108/56.1 |
| 5,465,672 A * | 11/1995 | Boyse | ................ | B65D 19/0012 108/56.1 |
| 5,484,241 A | 1/1996 | Haywood et al. | | |
| 5,592,885 A * | 1/1997 | Young, Jr. | .............. | B65D 19/20 108/56.1 |
| 5,996,509 A * | 12/1999 | Lai | ...................... | B65D 19/0012 108/51.3 |
| 6,041,719 A * | 3/2000 | Vidal | .................. | B65D 19/0002 108/56.3 |
| 6,155,181 A * | 12/2000 | Chilcutt | ............. | B65D 19/0075 108/56.1 |
| 6,739,270 B1 * | 5/2004 | Sewell | ............... | B65D 19/0012 108/51.3 |
| 7,426,890 B2 * | 9/2008 | Olvey | ................ | B65D 19/0036 108/56.1 |
| 8,113,129 B1 * | 2/2012 | Hurley | ............... | B65D 19/0028 108/56.3 |
| 10,480,557 B2 | 11/2019 | Dissen et al. | | |
| 2004/0226490 A1 | 11/2004 | Polumbaum | | |
| 2007/0227410 A1 * | 10/2007 | Chen | .................. | B65D 19/0095 108/51.3 |
| 2007/0256614 A1 * | 11/2007 | Chen | .................. | B65D 19/0069 108/153.1 |
| 2008/0295747 A1 * | 12/2008 | Vinderola | .......... | B65D 19/0028 108/51.3 |
| 2012/0204767 A1 * | 8/2012 | Jian | ..................... | B65D 19/0028 108/51.3 |
| 2012/0322642 A1 * | 12/2012 | Lu | ...................... | B65D 19/0095 493/405 |
| 2013/0032065 A1 * | 2/2013 | Le Monnier | ....... | B65D 19/0028 108/51.3 |
| 2015/0239609 A1 * | 8/2015 | Olvey | ................ | B65D 19/0012 108/51.3 |
| 2019/0144162 A1 * | 5/2019 | Burden | ..................... | B32B 1/00 248/346.02 |
| 2019/0177036 A1 * | 6/2019 | Dominguez Guevara | .................. | B65D 19/0095 |

FOREIGN PATENT DOCUMENTS

| | | |
|---|---|---|
| JP | S5145852 A | 4/1976 |
| JP | S52169257 U | 12/1977 |
| JP | H11-124138 A | 5/1995 |
| JP | 2003-312648 A | 11/2003 |
| JP | 2005-096804 A | 4/2005 |
| JP | 2012-062068 A | 3/2012 |
| JP | 2013-216387 A | 10/2013 |

* cited by examiner (a)

(b)

ARTICLE TRANSPORTATION PALLET

CROSS-REFERENCE TO RELATED APPLICATIONS

This application is the U.S. national phase entry under 35 U.S.C. § 371 of International Application No. PCT/JP2021/041695, filed on Nov. 12, 2021, which claims the benefit of priority to Japanese Application No. 2021-008451, filed on Jan. 22, 2021.

TECHNICAL FIELD

The present invention relates to an article transportation pallet or the like used for loading and transporting a variety of articles such as goods.

BACKGROUND ART

Article transportation pallets have conventionally and routinely been used in transporting, for example, large goods or a large number of goods particularly in the distribution industry. Examples of such article transportation pallets are shown. Patent Literature 1 is a metal pallet, Patent Literature 2 is a synthetic resin pallet, and Patent Literature 3 is a corrugated cardboard pallet.

CITATION LIST

Patent Literature

Patent Literature 1: Japanese Unexamined Patent Application Publication No. 2005-96804
Patent Literature 2: Japanese Unexamined Patent Application Publication No. H11-124138
Patent Literature 3: Japanese Unexamined Patent Application Publication No. 2012-62068

SUMMARY OF INVENTION

Technical Problem

However, such conventional article transportation pallets all keep a fixed shape, and the larger the articles to be transported, the larger the pallets become, and the pallets take up a lot of space in a storage area when not in use. Further, for example, when the pallets are transported for delivery or the pallets are used to transport goods and unload the articles at the destination and then only the pallets are collected and returned while loaded on a truck bed or container, many pallets cannot be loaded on the bed or container if they are large at the time of loading, and several trucks have to be prepared for the pallets, resulting in increasing the cost of transporting the pallets.

In view of these problems, the present invention provides an article transportation pallet which does not take up much space during storage or transportation and can normally load and transport articles during use.

Solution to Problem

In order to solve the foregoing problem, a first means includes a foldable pallet body having a first surface structure in which a plurality of first plate bodies formed in a strip shape are arranged so as to be parallel to each other in a plane direction and a second surface structure in which a plurality of second plate bodies formed in a strip shape are arranged so as to be parallel to each other in a plane direction, where the plurality of first plate bodies and the plurality of second plate bodies are arranged so that the plurality of second plate bodies intersect with the plurality of first plate bodies to constitute quadrilateral regions, each surrounded by four wall surfaces composed of two of the first plate bodies and two of the second plate bodies, and the first and second plate bodies are rotatably connected at intersection lines of the first and second plate bodies, and a holding means provided to the pallet body and configured to hold an expanded state when the pallet body is expanded into a use state.

As a result, when the first means is used as an article transportation pallet, the pallet body is expanded and the shape of the article transportation pallet can be held in the expanded state by the holding means. A plurality of quadrilateral regions surrounded by four wall surfaces are constituted, which allows the first means to withstand even the placement of heavy articles on the pallet body due to such a wall structure. Further, since the transportation cost can be reduced, the fuel cost for transportation can also be reduced and the fuel usage is reduced, as a result of which, the load on the environment can also be reduced.

Further, when the article transportation pallet is not in use, the holding means is removed, and for example, when the article transportation pallet is stored or the article transportation pallet itself is transported, a plurality of pallet bodies are stacked so as not to be bulky, so that the article transportation pallets can be made compact, do not take up much space for storage, and a large number of article transportation pallets can be transported at one time during transportation, which reduces the cost, too.

The "first and second plate bodies" are formed in a strip shape. Any material can be used as long as it is durable. For example, paper, plywood, or plastic is preferable, and they may be made of light metal.

The "quadrilateral region surrounded by four wall surfaces" is formed by intersecting two parallel first plate bodies and two parallel second plate bodies as a minimum unit. The quadrilateral region includes a square, a rhombus, and a rectangle.

The "intersection line of the first and second plate bodies" is a portion that serves as a central axis when the first and second plate bodies rotate relative to each other. As described later, engagement of slits half the length of the full width with each other is least costly and saves weight in order to form a rotation axis at the intersection portion. However, for example, an end portion of the second plate body may be swingably fixed on the front and back of a side surface of the first plate body, for example, with a tape or a string.

The "holding means" is a member attached to the pallet body to hold the pallet body in an expanded state. Because the movement of a part of the pallet body is transmitted and the entire pallet body is displaced, the pallet body can be held in the expanded state by restricting the movement of a part of the pallet body. For example, the holding means is preferably a member corresponding to an internal shape that is fitted into one or two or more quadrilateral regions surrounded by the four wall surfaces. Further, the holding means may be such a member that restricts the pallet body from the outside. For example, a frame member that matches the outer shape of the pallet body is preferable. Further, a plurality of wall surfaces of the pallet body may be pierced by a rod-like body.

As a second means, the pallet body is configured to assume a substantially quadrilateral or substantially rhombic outer shape when expanded into the use state, and a row of corner portions into which outer ends of the first plate bodies and the second plate bodies are integrated is configured to be formed on each outer edge in four directions around the pallet body.

In other words, the outer edge of the pallet body does not become an open distal end of the first plate body or the second plate body, but appears in a bent state in which the first plate body and the second plate body are connected. As a result, a portion near the outer edge of the pallet body, which is likely to come into contact with the bottom of goods or the like when articles such as goods are placed on the pallet body, is reinforced, so that the pallet body as a whole can firmly receive the load of the goods or the like from the center to the peripheral edge. When the pallet body is substantially quadrilateral, each outer edge in the four directions around the pallet body is arranged at an angle of 90 degrees.

The "substantially quadrilateral outer shape" in the "substantially quadrilateral outer shape when expanded into the use state" is because the pallet body has continuous lattice cells in which the first plate bodies and the second plate bodies intersect when expanded, so that the peripheral shape defined by straight lines does not appear as a quadrilateral shape but the line segment connecting the contour of the virtually expanded pallet body is quadrilateral, and thus, the pallet body has a shape that can be understood to be a shape that perfectly fits in a quadrilateral frame when viewed as a whole.

Such a shape of the corner portion into which the outer ends of the first plate body and the second plate body are integrated is preferably formed by bending a strip-shaped plate body. By bending the strip-shaped plate body, the first plate body and the second plate body in an intersecting direction with respect to the first plate body are formed. The first plate body and the second plate body may be integrated, for example, with a tape, an adhesive, a stapler, or the like.

As a third means, the holding means is configured to be a box member that is arranged in the quadrilateral region and is in contact with opposing surfaces of the wall surfaces constituting the quadrilateral region.

In this manner, by arranging the box member in contact with at least the opposing wall surfaces, the shape of the wall surfaces constituting the quadrilateral region is restricted. Therefore, the shape of the entire pallet body is kept.

The "box member" only needs to have a three-dimensional shape when in use and is preferably folded and stored in the same manner as the pallet body. For example, it may have a quadrilateral tubular shape or may have a channel shape in which one side is cut from four sides of the quadrilateral tubular shape. Further, for example, it may have a hexahedral shape in which lids are attached to the front and rear of a quadrilateral tubular body.

Further, as a fourth means, the holding means is configured to be a plate body that is arranged in the quadrilateral region and arranged in a cross shape with distal ends abutting against corners inside the quadrilateral region.

In this manner, when the plate body is arranged so as to be arranged in the cross shape with the distal ends abutting against the corners, the shape of the wall surfaces constituting the quadrilateral region is restricted. Therefore, the shape of the entire pallet body is kept. The cross-shaped plate body can preferably be disassembled.

Further, as a fifth means, the holding means is configured to be a frame member that surrounds the pallet body while being in contact with an outer periphery of the pallet body when the pallet body is expanded into the use state.

The shape of the pallet body is kept by restricting the deformation of the pallet body from the outside by the frame body.

Further, as a sixth means, the holding means is configured to be formed with an engagement portion that is engaged with an upper end of the pallet body when attached to the pallet body.

If the holding means is formed with the engagement portion that is engaged with the upper end of the pallet body, the holding means has the engagement portion engaged with the upper end of the pallet body when the holding means is attached to the pallet body and the pallet body is lifted up. Therefore, the holding means does not fall off from the pallet body. The engagement portion is preferably, for example, a protrusion or the like formed in an overhanging manner on the "box member" or the "plate body", which is the holding means. Alternatively, a hook member may be attached to the "box member" or the "plate body" and locked, for example, to the upper end of the pallet body.

Further, as a seventh means, a fixing member fixing the holding means to the pallet body so that the holding means does not fall off when the pallet body is lifted up is configured to be provided.

For example, the fixing member preferably fixes the "box member" or the "plate body", which is the holding means, by piercing the pallet body side using, for example, a pin, skewer, or the like.

Further, as an eighth means, the holding means is configured to be a projection piece integrally formed with a part of at least one of the first plate bodies and the second plate bodies constituting the pallet body.

By providing the pallet body with the projection piece for holding the pallet body in the expanded state, the need for providing the holding means separately is eliminated. The projection piece is preferably configured to be inserted into the quadrilateral region of the pallet body itself.

Further, as a ninth means, angles formed by the first plate bodies and the second plate bodies when held by the holding means are configured to be a right angle.

As a result, the quadrilateral region surrounded by the four wall surfaces becomes a square or a rectangle, and the area of the pallet body when expanded is maximized. Further, this is the angle at which the pallet body is least likely to be folded against pressure from an oblique direction.

Further, as a tenth means, the intersection lines formed by the first plate bodies and the second plate bodies are configured to be formed by engaging slits half the length of the full width formed on the first plate bodies and the second plate bodies with each other.

That is, the first plate bodies and the second plate bodies are connected in such a manner as to insert each other into the counterparts from the direction of openings of the slits so that their own slits sandwich the counterpart plate bodies.

This is because forming the intersection lines in this manner allows the first and second plate bodies to be most easily rotatable and can facilitate the assembly of the pallet body composed of the first and second plate bodies.

Further, as an eleventh means, upper ends of the first and second plate bodies are configured to be flush with each other.

This is because in order to place articles such as goods on the pallet body, the upper ends are preferably on the same plane for the stability of the placed articles and also the load when the goods or the like are placed can be distributed.

Further, as a twelfth means, the pallet body is configured to be formed with holes or notches for inserting a fork of a forklift.

As a result, when the pallet body is expanded, passages of the holes or notches are formed in a direction intersecting with the pallet body, so that the fork of the forklift can be inserted into rows of the holes or notches to lift the pallet body.

Further, as a thirteenth means, the pallet body is configured to be made of any of paper, plastic, or aluminum alloy.

When made of paper, plastic, or aluminum alloy, the pallet body can be made lightweight, so that it is preferable as a material for the pallet body. The present invention does not exclude materials other than these.

Each invention of the first to thirteen means described above can be arbitrarily combined. In particular, it is preferable to have the configuration of the first means and to have a combination with at least any one configuration of the inventions of the second to twelfth means. Any component of each invention of the first to thirteenth means may be extracted and combined with other components.

Advantageous Effects of Invention

In the above invention, the shape of the article transportation pallet can be held in the expanded state by the holding means when the foldable pallet body is expanded.

DESCRIPTION OF EMBODIMENTS

Figure 1:
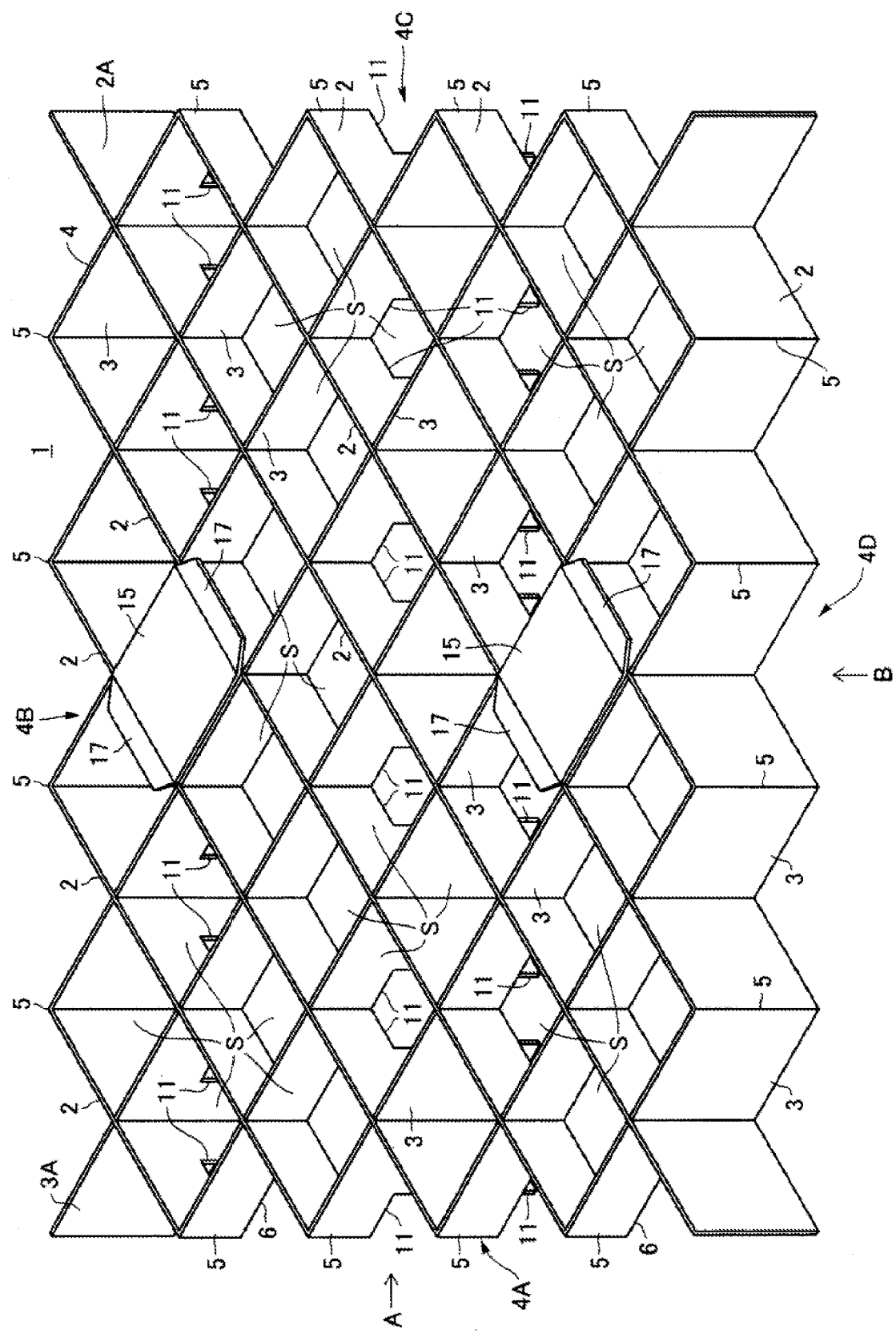
FIG. 1 is a perspective view of a state in which a pallet body of an embodiment is expanded and two boxes for holding the shape are attached.

Hereinafter, specific embodiments of the present invention will be described with reference to the drawings.

Referring to FIG. 1 to FIG. 8, an article transportation pallet 1 (hereinafter, abbreviated as a pallet 1) of an embodiment will be described.

As shown in FIG. 1, FIG. 2, FIG. 4, and FIG. 8, the pallet 1 includes a pallet body 4 in which a plurality of strip-shaped first plate bodies 2 arranged so as to be parallel to each other in a plane direction at regular intervals and a plurality of strip-shaped second plate bodies 3 similarly arranged so as to be parallel to each other in a plane direction are intersected.

Figure 8:
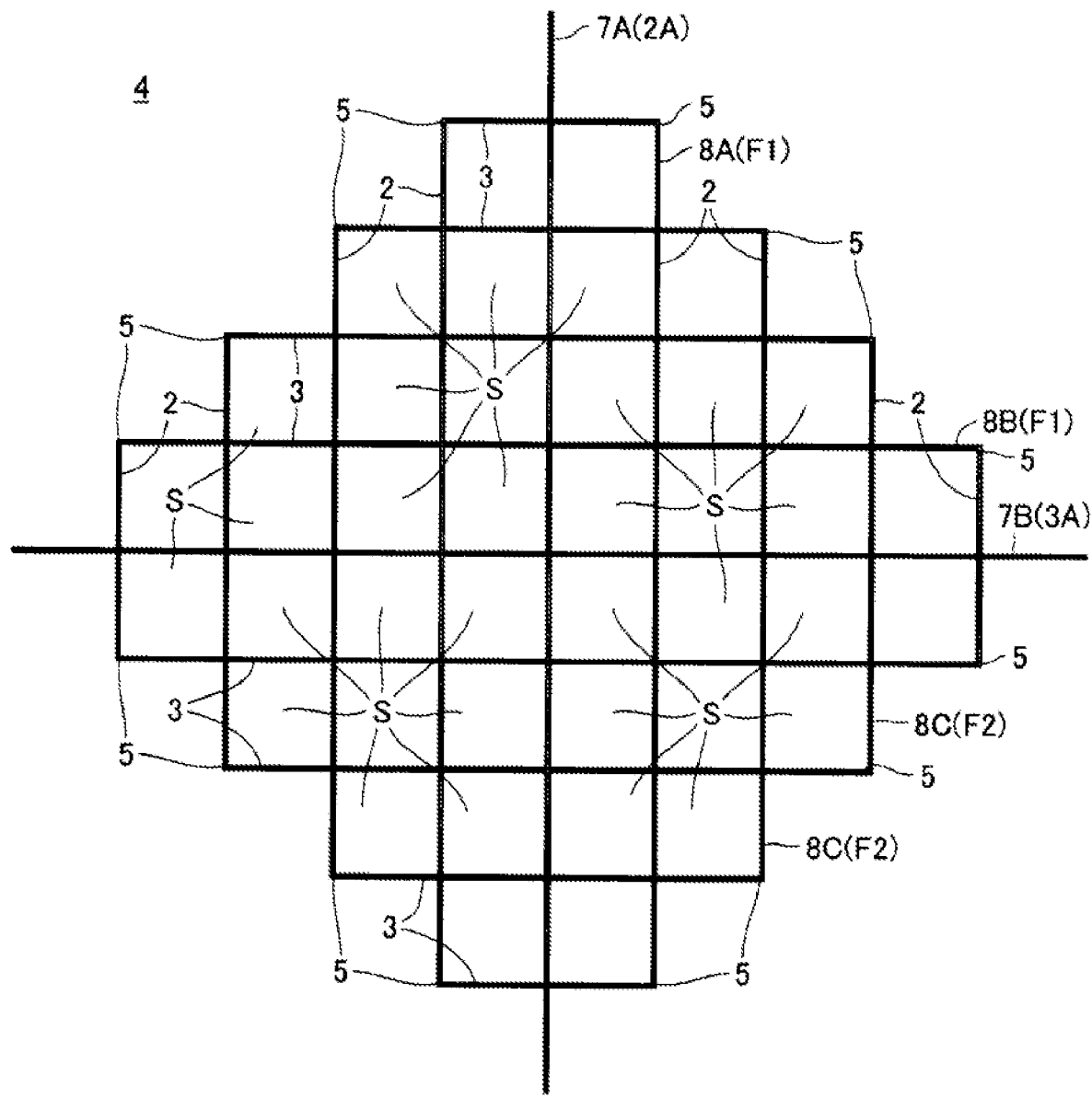
FIG. 8 is a plan view of a state in which the two frame bodies of 2 units×8 units are intersected with the two intersected frame bodies of 4 units×6 units and first base plate bodies of 10 units are intersected in a cross shape.

In the pallet body 4, there are formed quadrilateral regions S each surrounded by four wall surfaces composed of two first plate bodies 2 and two second plate bodies 3 in the expanded state of FIG. 1 and FIG. 8. The quadrilateral region S has a square shape in plan view. In other words, in the expanded state, the first plate bodies 2 and the second plate bodies 3 are arranged so as to be orthogonal to each other.

In the present embodiment, the width of the wall surfaces of the first plate bodies 2 (or the second plate bodies 3) constituting the quadrilateral region S is defined as a basic unit, and one basic unit is hereinafter referred to as "1 unit".

For example, the quadrilateral region S is a region surrounded by lengths of 1 unit of the four first plate bodies 2 and second plate bodies 3. In the present embodiment, the length of 1 unit is 15.5 cm as an example.

In the present embodiment, the quadrilateral region S is formed by intersecting nine parallel first plate bodies 2 and nine parallel second plate bodies 3. The nine parallel first plate bodies 2 constitute a first surface structure and the nine parallel second plate bodies 3 constitute a second surface structure. The nine parallel first plate bodies and second plate bodies 3 are each configured to have a length of 2 units, 4 units, 6 units, 8 units, 10 units, 8 units, 6 units, 4 units, or 2 units in order from the end, and are arranged so as to be mirror symmetrical about a first plate body 2A (or a second plate body 3A) having a length of 10 units. The distance (length) between the first plate bodies 2 (or second plate bodies 3) arranged in parallel is 1 unit. Further, the vertical width of the pallet 1 is also configured with a length of 1 unit. The pallet body 4 assumes a substantially square outer shape in plan view with a size of approximately 110 cm×110 cm as a whole in the expanded state. At four outer edges 4A to 4D when the pallet body 4 is seen as a square, a row of four corner portions 5 in which distal ends of the first plate bodies 2 and the second plate bodies 3 are joined at an angle of 90 degrees is arranged. A region surrounded by a straight line passing through vertices of the four corner portions 5 of each of the outer edges 4A to 4D is formed in a square shape.

Figure 2:
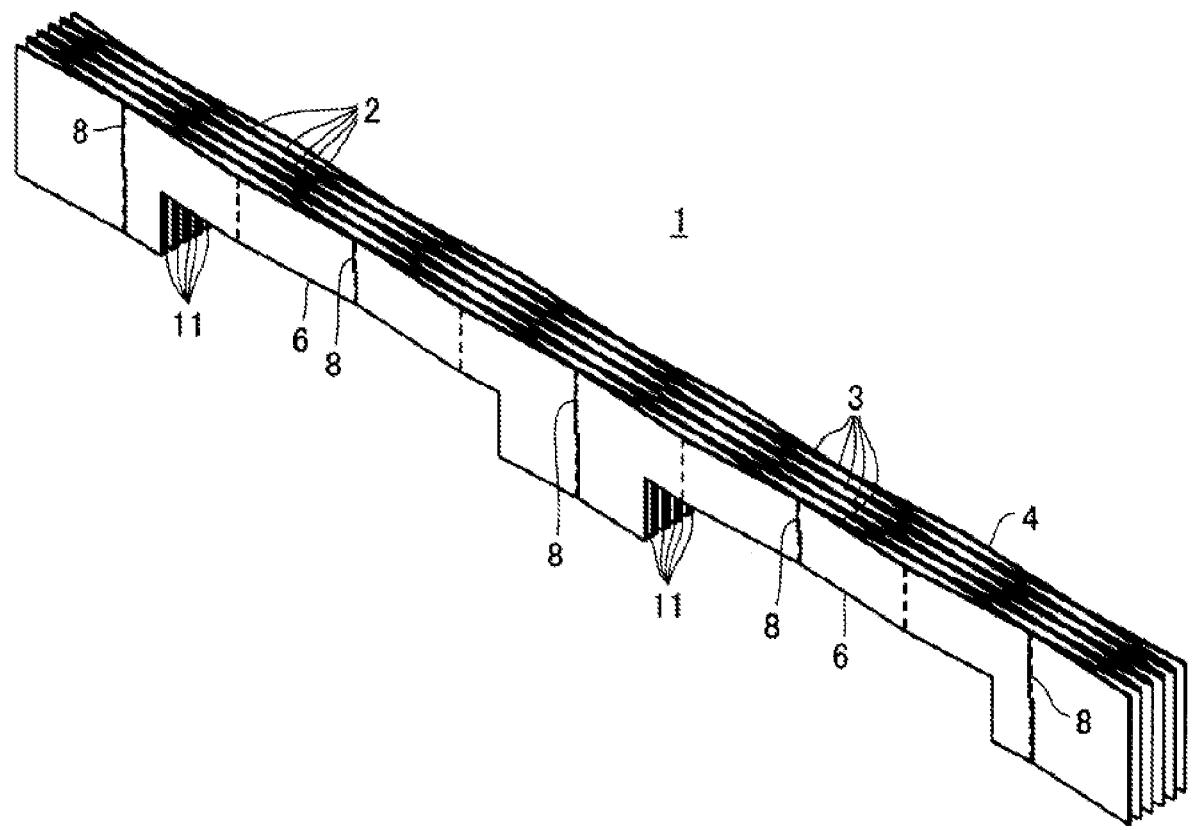
FIG. 2 is a perspective view of a state in which the same pallet body is folded.

As shown in FIG. 2, in a closed state, the pallet body 4 is folded into a long body having a length of 10 units with a plurality of intersected first plate bodies 2 and second plate bodies 3 overlapped.

Figure 4A:
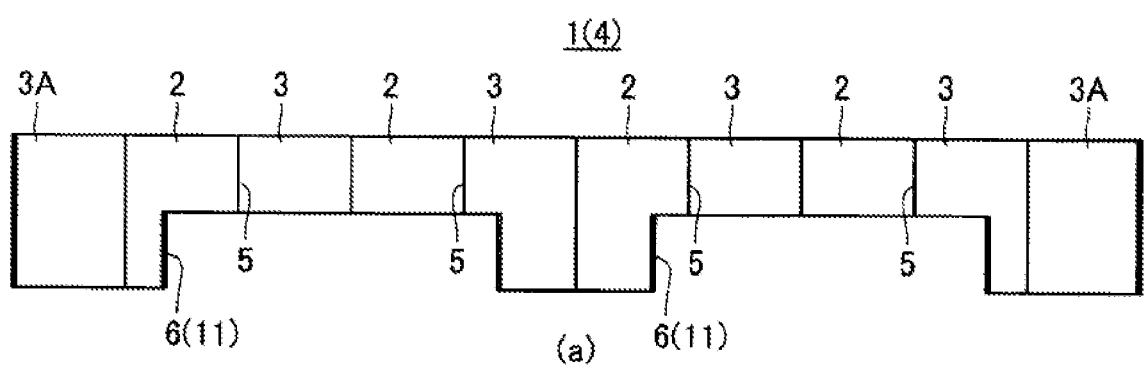
FIG. 4(a) is a plan view of the pallet body viewed from direction A of FIG. 1.
Figure 4B:
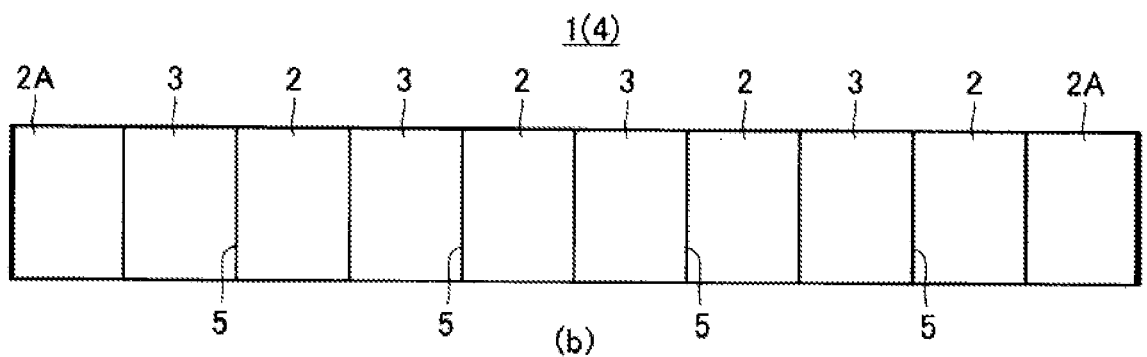
FIG. 4(b) is a plan view of the pallet body viewed from direction B of FIG. 1.

As shown in FIG. 4(a), in the expanded state, the pallet body 4 is formed with passages 6 through which a fork of a forklift is inserted between two opposing outer edges 4A, 4C.

Next, constituent members constituting the pallet body 4 will be described.

Figure 3:
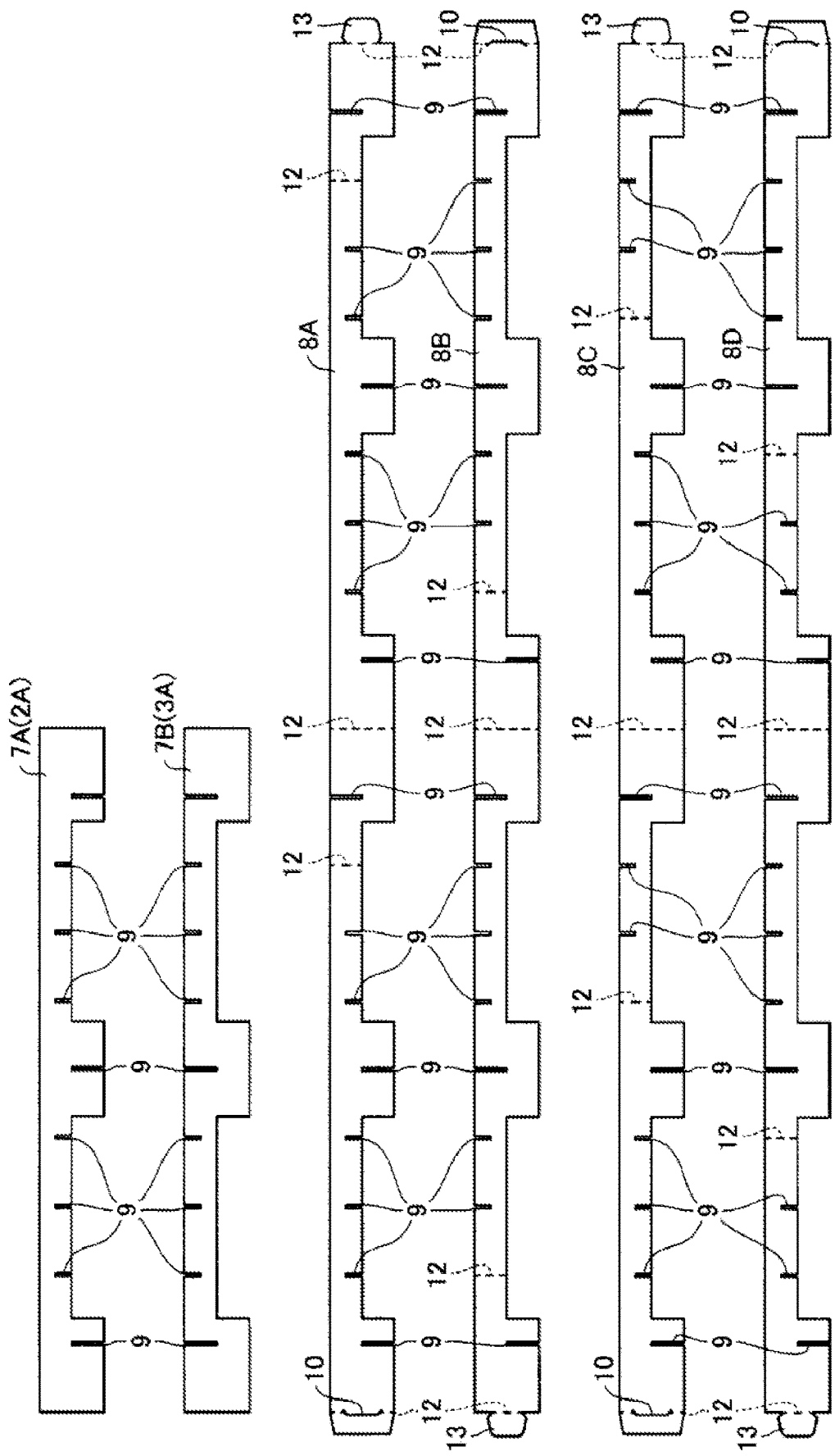
FIG. 3 is a plan view of a state in which two first base plate bodies and four second base plate bodies used to form a first plate body and a second plate body are arranged.

As shown in FIG. 3, the first plate bodies 2 and the second plate bodies 3, which are units constituting the pallet body 4, are composed of two first base plate bodies 7A, 7B and four second base plate bodies 8A to 8D. The first base plate bodies 7A, 7B and the second base plate bodies 8A to 8D are all made of corrugated cardboard. The base plate bodies 7A, 7B, 8A to 8D are formed, at predetermined positions, with slits 9 for engagement at the time of intersecting with the other first base plate bodies 7A, 7B and second base plate bodies 8A to 8D located in the intersecting direction. The depth of cut of the slits 9 is set to be half the vertical width of each of the base plate bodies 7A, 7B, 8A to 8D, and the mutual slits 9 are inserted into the counterpart slits 9 to be connected. The number of slits 9 in each of the base plate bodies 7A, 7B, 8A to 8D corresponds to intersection portions with the base plate bodies 7A, 7B, 8A to 8D to be intersected other than itself. The vertical width of the connected intersection portions is the same as the vertical width of the base plate bodies 7A, 7B, 8A to 8D and becomes linear in the vertical direction, and the base plate bodies 7A, 7B, 8A to 8D freely rotate about the intersection portions in an angle range of 180 degrees in forward and reverse directions.

The outer shapes of the first base plate bodies 7A, 7B are the same and only the positions of the slits 9 are different. The first base plate bodies 7A, 7B are paired and become a first plate body 2A and a second plate body 3A having a length of 10 units and arranged in a cross in the center in a state in which the pallet body 4 is assembled and expanded.

The second base plate bodies 8A to 8D also have the same outer shape and only the positions of the slits 9 and the positions of a connecting claw 13 and a connecting slit 10 formed at both ends in the longitudinal direction are different. The second base plate bodies 8A to 8D have a length twice the first base plate bodies 7A, 7B obtained by adding two first base plate bodies 7A, 7B in series. The second base plate bodies 8A to 8D are used in an endless shape (ring-like shape) by inserting the connecting claws 13 into the connecting slits 10. Two base plate bodies 8A, 8B (the third and fourth arrangement positions from the top in the figure) are paired to form a rectangular frame body F1 of 2 units×8 units. Two second base plate bodies 8C, 8D (the fifth and sixth arrangement positions from the top in the figure) are paired to form a rectangular frame body F2 of 4 units×6 units.

In forming the rectangle of the second base plate bodies 8A to 8D, they are formed into an endless shape and then bent at four folds 12 (roots of the connecting claws 13 and connecting slits 10 are also overlapped to form the folds 12) to be formed into a rectangular frame shape. Opposing sides of the rectangle become the first plate bodies 2 and sides orthogonal thereto become the second plate bodies 3. Four corner portions of the frame bodies F1, F2 become the corner portions 5 of the pallet body 4.

Rectangular cut portions 11 which are to form the passages 6 are formed on lower sides of the base plate bodies 7A, 7B, 8A to 8D.

Such first plate bodies 2 and second plate bodies 3 are assembled to construct the pallet body 4 as follows. The following assembly order is an example in which an intersecting state of the frame body F1 and the frame body F is easy to understand, and the pallet body 4 can be constructed in another assembly order.

Figure 5A:
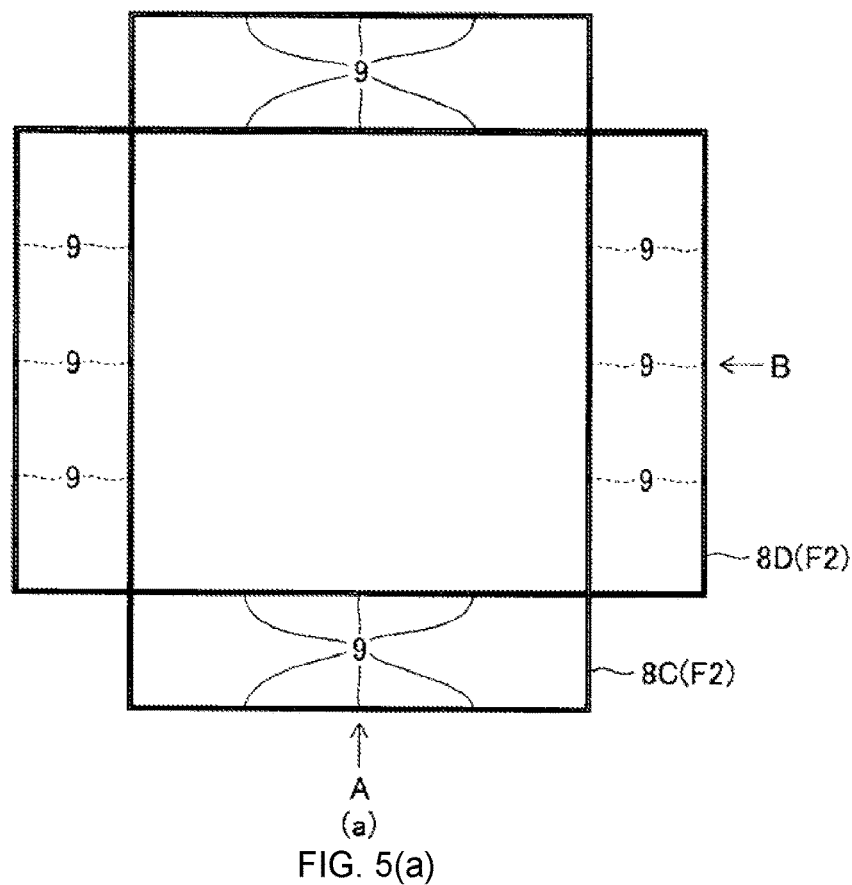
FIG. 5(a) is a plan view of a state in which frame bodies of 4 units×6 units are intersected.
Figure 5B:
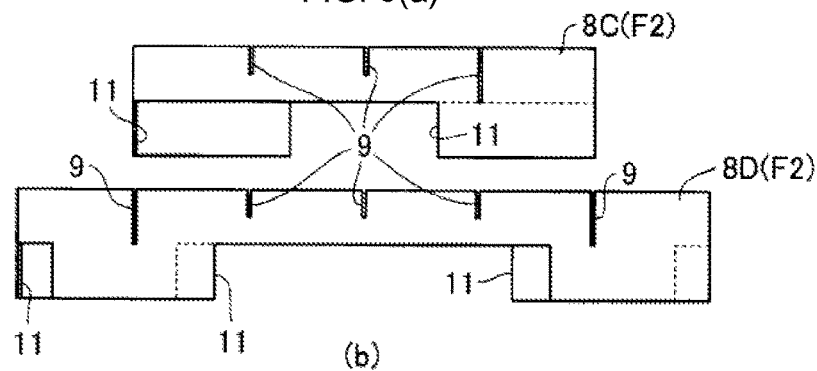
FIG. 5(b) is a front view showing an arrangement before the intersection, viewed from direction A of FIG. 5(a)
Figure 5C:
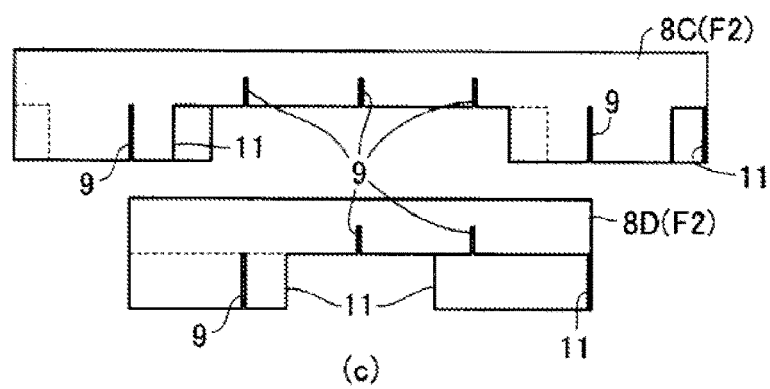
FIG. 5(c) is a side view showing the arrangement before the intersection, viewed from direction B of FIG. 5(a).

First, as shown in FIG. 5(a) to FIG. 5(c), the frame bodies F2 of 4 units×6 units are prepared for the second base plate bodies 8C, 8D, arranged at rotationally symmetrical positions shifted by 90 degrees in orientation of 4 units×6 units so that the second base plate body 8C is placed on the upper side, and intersected in such a manner as to insert upper and lower opposing slits 9 into each other. The frame body F2 has a difference of 2 units in length and width, so that rectangles of 1 unit×4 units are constituted outside a square of 4 units×4 units in the center as shown in FIG. 5(a) by intersecting the frame bodies F2.

Figure 6A:
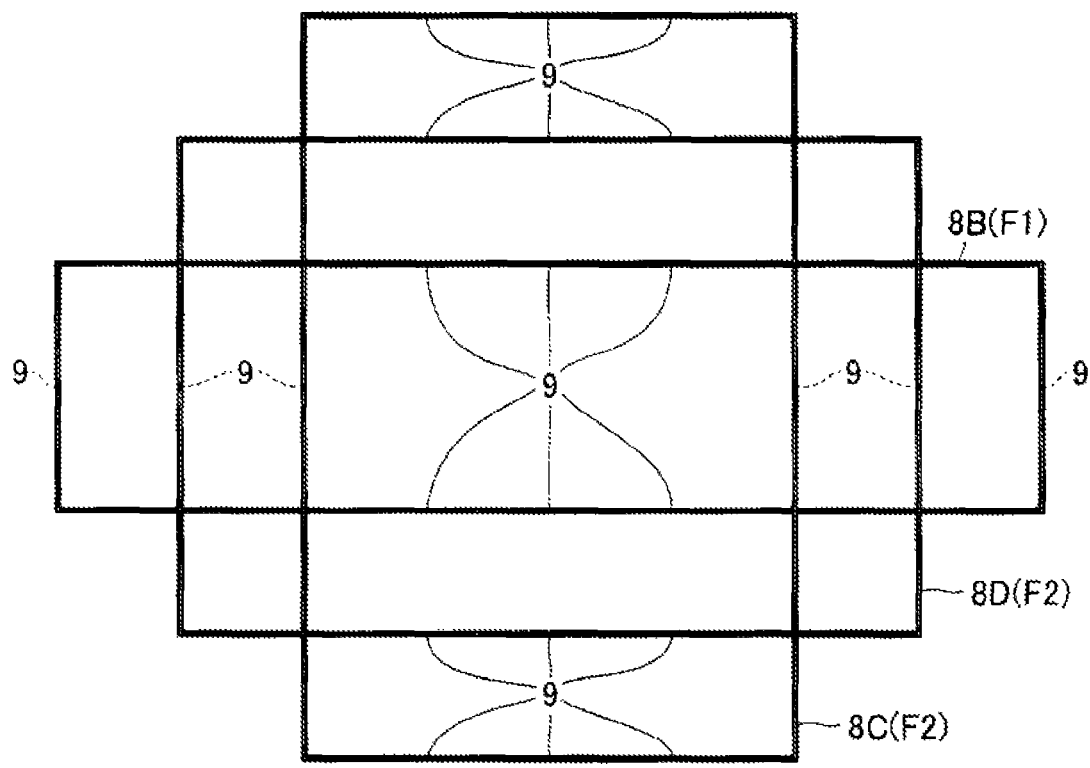
FIG. 6(a) is a plan view of a state in which one frame body of 2 units×8 units is intersected with the two intersected frame bodies of 4 units×6 units.
Figure 6B:
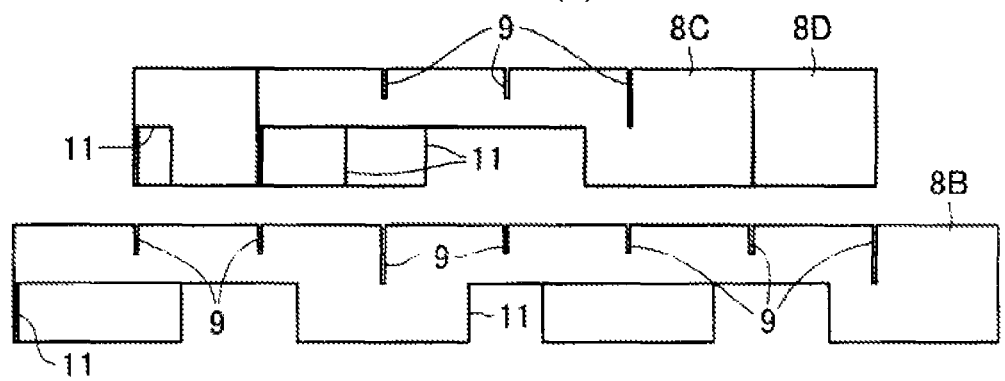
FIG. 6(b) is a front view just before the one frame body of 2 units×8 units is intersected with the two intersected frame bodies of 4 units×6 units.
Figure 6C:
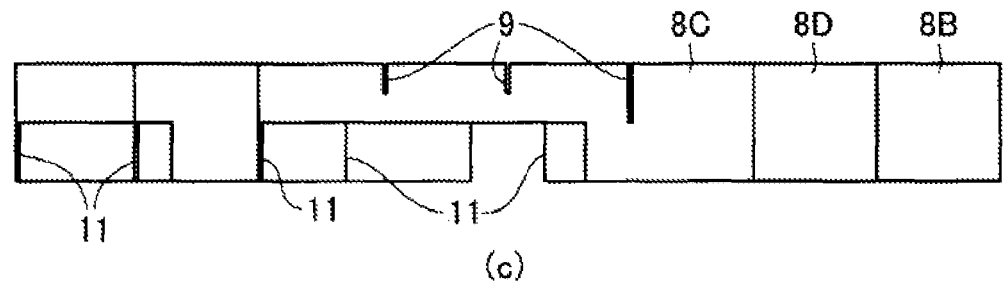
FIG. 6(c) is a front view of the state in which the one frame body of 2 units×8 units is intersected with the two intersected frame bodies of 4 units×6 units.

With respect to the frame bodies F2 thus combined, as shown in FIG. 6(a) to FIG. 6(c), first, the frame body F1 of the second base plate body 8A to be arranged on the lower side is combined. The frame body F1 of the second base plate body 8A which becomes a rectangle of 2 units×8 units is intersected relatively from below with the combined frame bodies F2 so that the longitudinal side becomes the longitudinal side of the frame body F2 of the second base plate body 8D, that is, so as to sandwich the frame body F2 of the second base plate body 8D. In the intersecting state, four squares of 1 unit×12 units, four rectangles of 1 unit×2 units, four rectangles of 1 unit×4 units, and one rectangle of 2 units×4 units are constituted as shown in FIG. 6(a).

Figure 7A:
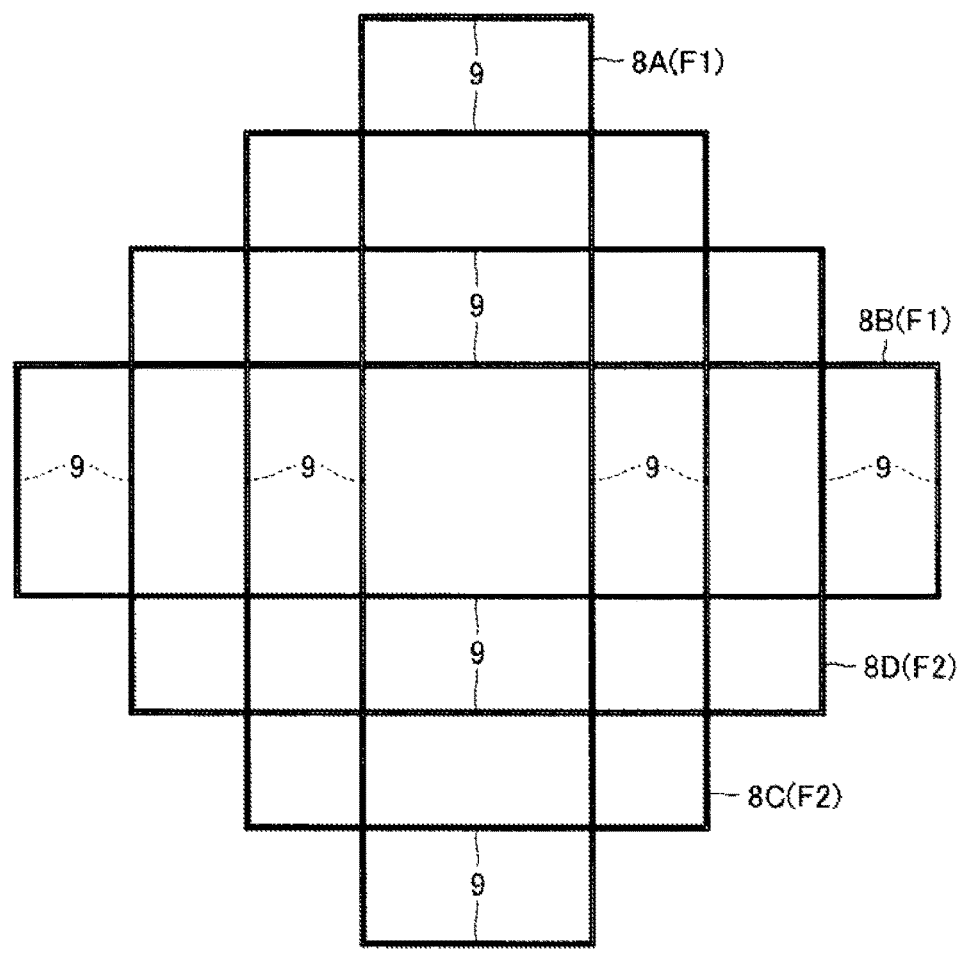
FIG. 7(a) is a plan view of a state in which two frame bodies of 2 units×8 units are intersected with the two intersected frame bodies of 4 units×6 units.
Figure 7B:
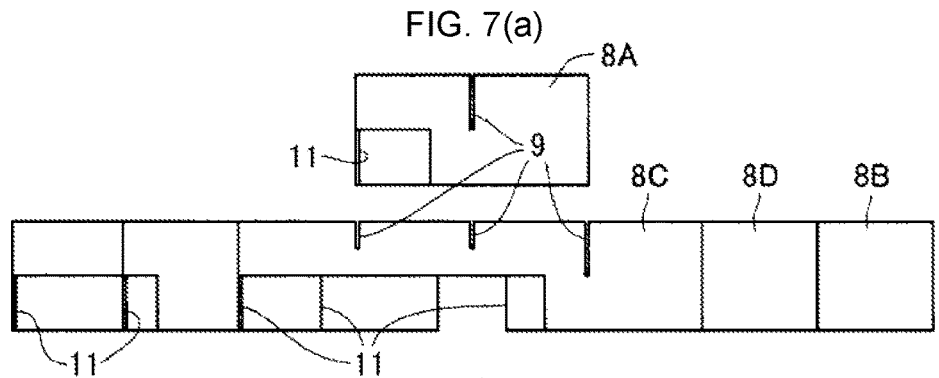
FIG. 7(b) is a front view just before one frame body of 2 units×8 units is intersected with the two intersected frame bodies of 4 units×6 units.
Figure 7C:
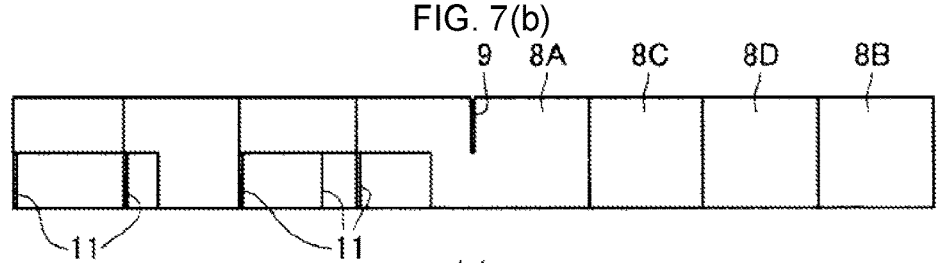
FIG. 7(c) is a front view of a state in which the one frame body of 2 units×8 units is intersected with the two intersected frame bodies of 4 units×6 units.

Next, with respect to the frame bodies F2+the lower frame body F1 thus combined, as shown in FIG. 7(a) to FIG. 7(c), the frame body F1 of the second base plate body 8A to be arranged on the upper side is combined. The order of the frame body F1 combined with the frame bodies F2 may be reversed. In the intersecting state, 12 squares of 1 unit×12 units, 12 rectangles of 1 unit×2 units, and one square of 2 units×2 units are constituted as shown in FIG. 7(a).

Finally, the pallet body 4 is completed by intersecting the first plate body 2A and the second plate body 3A having a length of 10 units from the vertical direction with respect to the combination of the frame bodies F1 and the frame bodies F2 (the one in the state of FIG. 7(*a*)) in a cross as in FIG. 8. In the state in which the pallet body 4 is completed, a total of 40 squares of 1 unit×1 unit are constituted. Their interiors each serve as the quadrilateral region S.

By the foregoing configuration, the following effects can be exhibited in the pallet 1 (pallet body 4) of the embodiment.

(1) By folding the pallet 1 as in FIG. 2 from the state of FIG. 1, it can be made compact compared with the mode of use, so that it does not take up much space, which is advantageous in storage and transportation.

(2) The pallet body 4 has a three-dimensional structure composed of 40 quadrilateral regions S of 1 unit×1 unit, and supports the load of goods or the like placed in a cross-section direction. Since the load is distributed, the pallet body 4 is strong even if the space is large, and is sufficiently durable as a pallet.

(3) The pallet body 4 has a three-dimensional structure space in which the quadrilateral regions S of 1 unit×1 unit are continuous vertically and horizontally, so that it can be significantly reduced in weight.

(4) The four outer edges on the periphery of the pallet body 4 are arranged with the rows of four corner portions 5 in which the distal ends of the first plate bodies 2 and the second plate bodies 3 are joined at an angle of 90 degrees, and are bordered with a firm rigid structure. Therefore, goods or the like can be supported firmly from the center to the outer side of the pallet body 4.

(5) The pallet body 4 is constructed only by two first base plate bodies 7A, 7B and four second base plate bodies 8A to 8D. That is, the frame bodies F1, F2 are assembled and then combined. Therefore, the number of members is small, and thus, labor required for assembly up to completion of the pallet body 4 is eliminated and this also contributes to cost reduction.

Next, several embodiments of the holding means, which is part of the pallet 1 and attached to the pallet body 4 to hold the pallet body 4 in the expanded state, will be described.

Embodiment 1

Figure 9A:
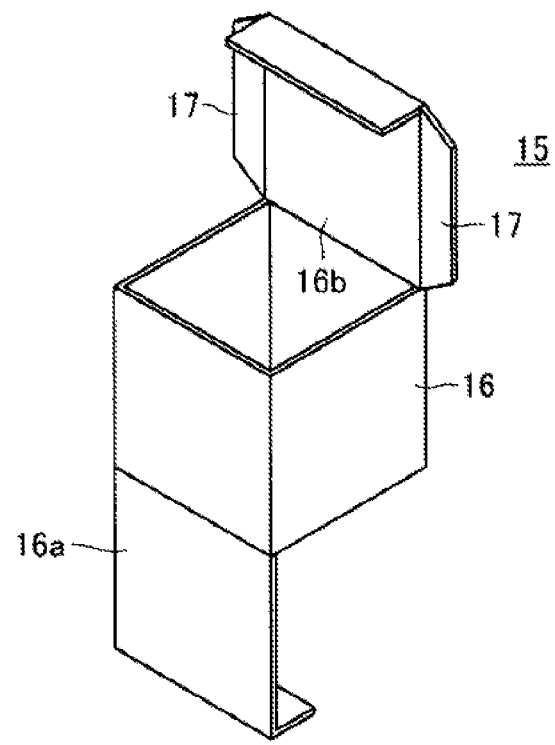
FIG. 9(a) is a perspective view of a state before assembly of a box of Embodiment 1 and FIG. 9(b) is a perspective view of a state after assembly of the same box.
Figure 9B:
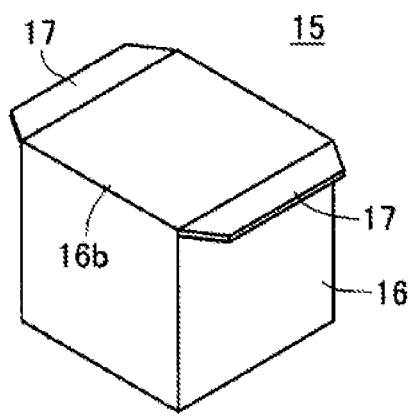

As shown in FIG. 9(*a*) and FIG. 9(*b*), a box 15 as the holding means includes a corrugated cardboard main body 16 having a size of the quadrilateral region S of the pallet body 4, that is, a cube (regular hexahedron) composed of sides having a length of just 1 unit. The main body 16 is composed of quadrilateral tubular four walls 16*a*, a top lid 16*b*, and a bottom lid 16*c*. Overhanging pieces 17 as engagement portions are formed on two opposing sides of the top lid 16*b*.

The box 15 is brought into a use state as in FIG. 9(*b*) by expanding the folded main body 16 into a quadrilateral tubular shape and closing upper and lower openings with the top lid 16*b* and the bottom lid 16*c*, and is dropped into the quadrilateral region S from above the expanded pallet body 4 to be used. Although the quadrilateral region S of the expanded pallet body 4 is formed in a tubular shape in the vertical direction, the overhanging pieces 17 of the top lid 16*b* are each engaged with an upper edge of the first plate body 2 or the second plate body 3. Thus, the box 15 does not easily fall off from the quadrilateral region S even if the pallet body 4 is lifted up. FIG. 1 is a state in which two boxes 15 are spaced apart and arranged in a well-balanced manner as an example.

By using such a box 15, the angles of the wall surfaces in the periphery of the quadrilateral region S accommodating the box 15 of the pallet body 4 are fixed, and the angles of all the first plate bodies 2 and the second plate bodies 3 constituting the pallet body 4 are linked, so that the pallet body 4 can be held while expanded. Further, since the box 15 is supported by the overhanging pieces 17, the box 15 is held by the pallet body 4.

Embodiment 2

Figure 10A:
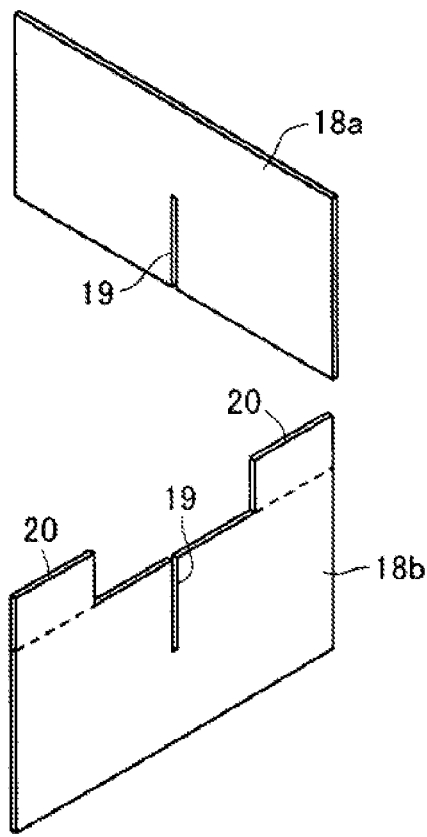
FIG. 10(a) is a perspective view of a state before assembly of a cross plate of Embodiment 2 and FIG. 10(b) is a perspective view of a state after assembly of the same cross plate.
Figure 10B:
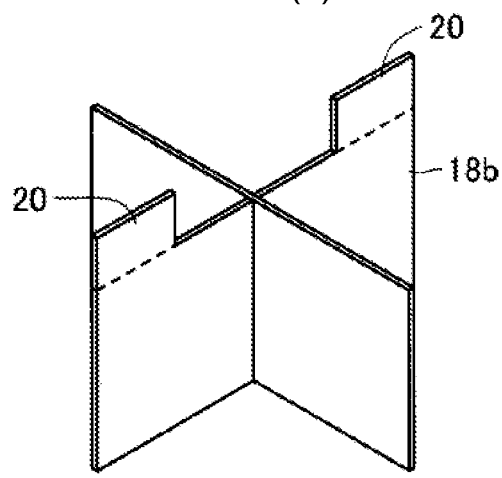

As shown in FIG. 10(*a*) and FIG. 10(*b*), a cross plate 18 as the holding means is constituted by combining a first plate 18*a* and a second plate 18*b* made of corrugated cardboard in a cross. The first plate 18*a* is a rectangular plate body having an exact length of the diagonal line of the quadrilateral region S and a vertical width of 1 unit. At a central position in the longitudinal direction, a slit 19 is formed from the lower end to the center. The second plate 18*b* is also a rectangular plate body having a length of the diagonal line of the quadrilateral region S and a vertical width of 1 unit. At a central position in the longitudinal direction, a slit 19 is formed from the upper end to the center. An overhanging piece 20 serving as the engagement portion is formed at both sides of an opening of the slit 19 at the upper end of the second plate 18*b*. The cross plate 18 is assembled by engaging the slits 19 at the central positions with each other in such a manner as to intersect them in a cross.

The cross plate 18 is arranged in the quadrilateral region S of the pallet body 4 so as to abut against the corners of the quadrilateral region S in the same manner as Embodiment 1. The overhanging pieces 20 are bent in the arranged state and locked to the upper edge of the adjacent first plate body 2 or second plate body 3.

By using such a cross plate 18, the angles of the wall surfaces in the periphery of the quadrilateral region S accommodating the cross plate 18 of the pallet body 4 are restricted, and the angles of all the first plate bodies 2 and the second plate bodies 3 constituting the pallet body 4 are linked, so that the pallet body 4 can be held while expanded. Further, since the cross plate 18 is supported by the overhanging pieces 20, the box 15 is held by the pallet body 4.

Embodiment 3

Figure 11A:
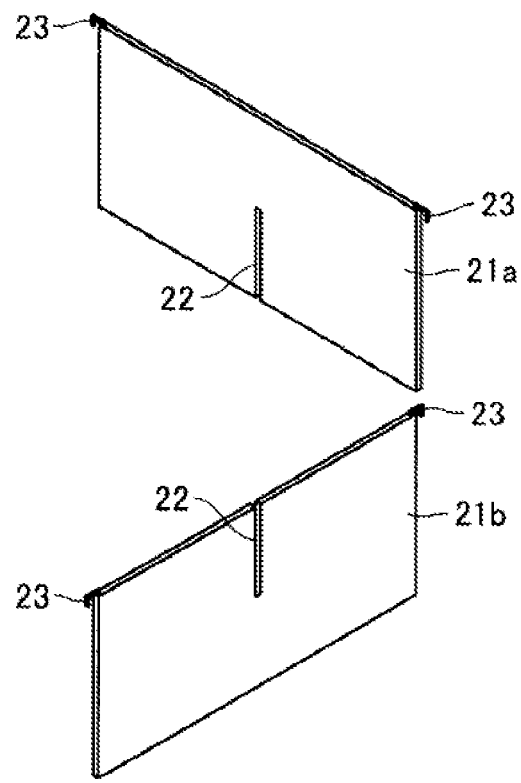
FIG. 11(a) is a perspective view of a state before assembly of a cross plate of Embodiment 3 and FIG. 11(b) is a perspective view of a state after assembly of the same cross plate.
Figure 11B:
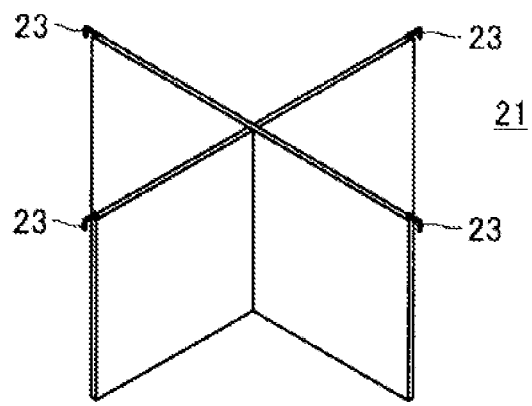
Figure 12A:
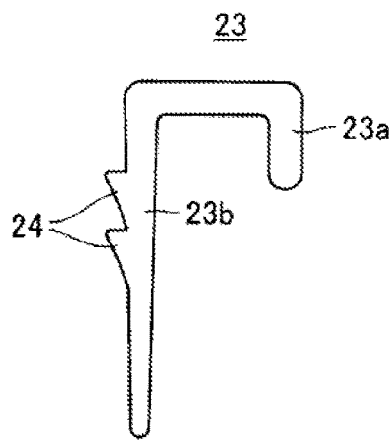
FIG. 12(a) is a front view and FIG. 12(b) is a perspective view of a hook used in Embodiment 3.
Figure 12B:
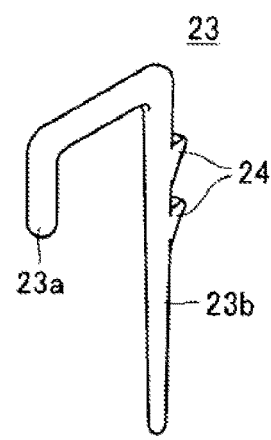

As shown in FIG. 11(*a*) and FIG. 11(*b*), a cross plate 21 as the holding means is constituted by combining a first plate 21*a* and a second plate 21*b* made of corrugated cardboard. In the same manner as Embodiment 2, the cross plate 21 is assembled by engaging slits 22 at central positions with each other in such a manner as to intersect them in a cross. A hook 23 as the engagement portion different from that of Embodiment 2 is used in Embodiment 3. As shown in FIG. 12(*a*) and FIG. 12(*b*), the hook 23 is composed of a bent distal end portion 23*a* and a rod-like insertion portion 23*b*. Barbs 24 are formed on a side surface of the insertion portion 23*b*. The hook 23 is fixed by inserting the insertion portion 23*b* side into both ends of the upper portions of the first plate 21*a* and the second plate 21*b* and is attached so that the distal end portion 23*a* overhangs laterally.

Such a cross plate 21 is arranged so as to abut against the corners of the quadrilateral region S of the pallet body 4 in the same manner as Embodiment 2. The cross plate 21 is held by the pallet body 4 by locking the distal end portions 23*a* of the hooks 23 to the upper edges of the corners.

Embodiment 4

Figure 13A:
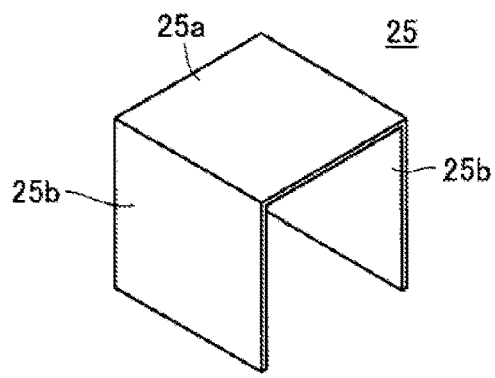
FIG. 13(a) is a perspective view of a piece of Embodiment 4 and FIG. 13(b) is a perspective view of a state in which the same piece is folded.
Figure 13B:
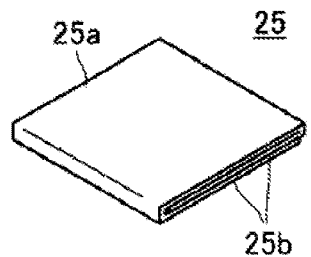

As shown in FIG. 13(*a*) and FIG. 13(*b*), a foldable corrugated cardboard channel-shaped piece 25 may be arranged in the quadrilateral region S of the pallet body 4 as the holding means. The piece 25 is composed of a top plate 25*a* and left and right side plates 25*b* hanging down from both ends of the top plate 25*a* in a usable state of FIG. 13(*a*). The top plate 25*a* is formed with a length of exact 1 unit×1 unit. The piece 25 can be stored by overlapping the top plate 25*a* and the two left and right side plates 25*b*.

When such a holding means is used, the angles of the wall surfaces in the periphery of the quadrilateral region S are restricted by the top plate 25*a*. Since the angles of all the first plate bodies 2 and the second plate bodies 3 constituting the pallet body 4 are linked, the pallet body 4 can be held while expanded.

Embodiment 5

Figure 14A:
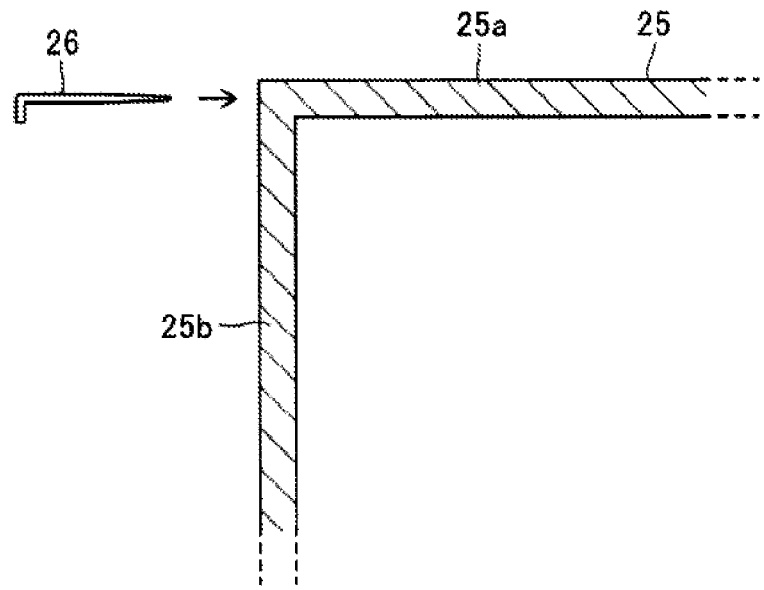
FIG. 14(a) is an explanatory diagram for explaining a state in which a hook pin is pierced from a side of a top plate and FIG. 14(b) is an explanatory diagram of a state in which a bent distal end portion of the hook pin is locked to an upper edge of the first plate body or the second plate body, in Embodiment 5.
Figure 14B:
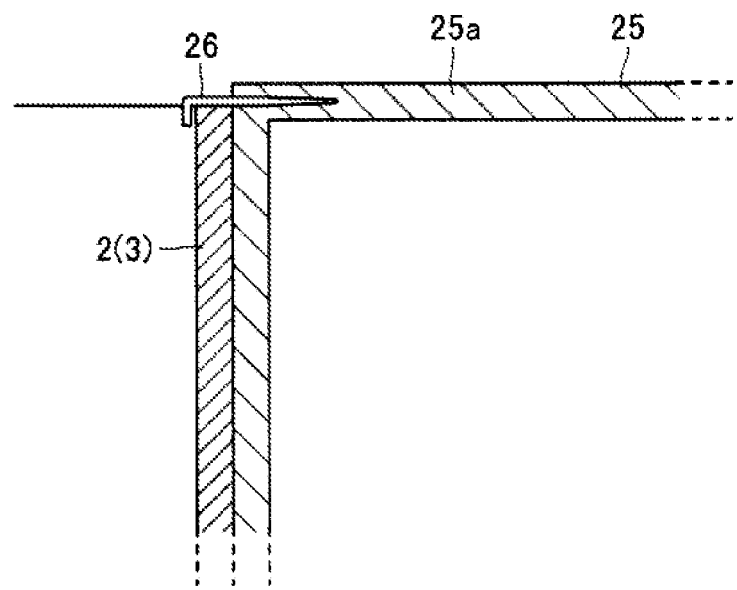

As it is, the piece 25 of Embodiment 4 may fall off from the pallet body 4 when the pallet body 4 is lifted high during use. Thus, a tip-pointed hook pin 26 is pierced from the side of the top plate 25*a* as shown in FIG. 14(*a*), and a bent distal end portion 26*a* is locked to the upper edge of the first plate body 2 or the second plate body 3 to be used as shown in FIG. 14(*b*), thereby preventing the piece 25 from falling off.

Embodiment 6

Figure 15:
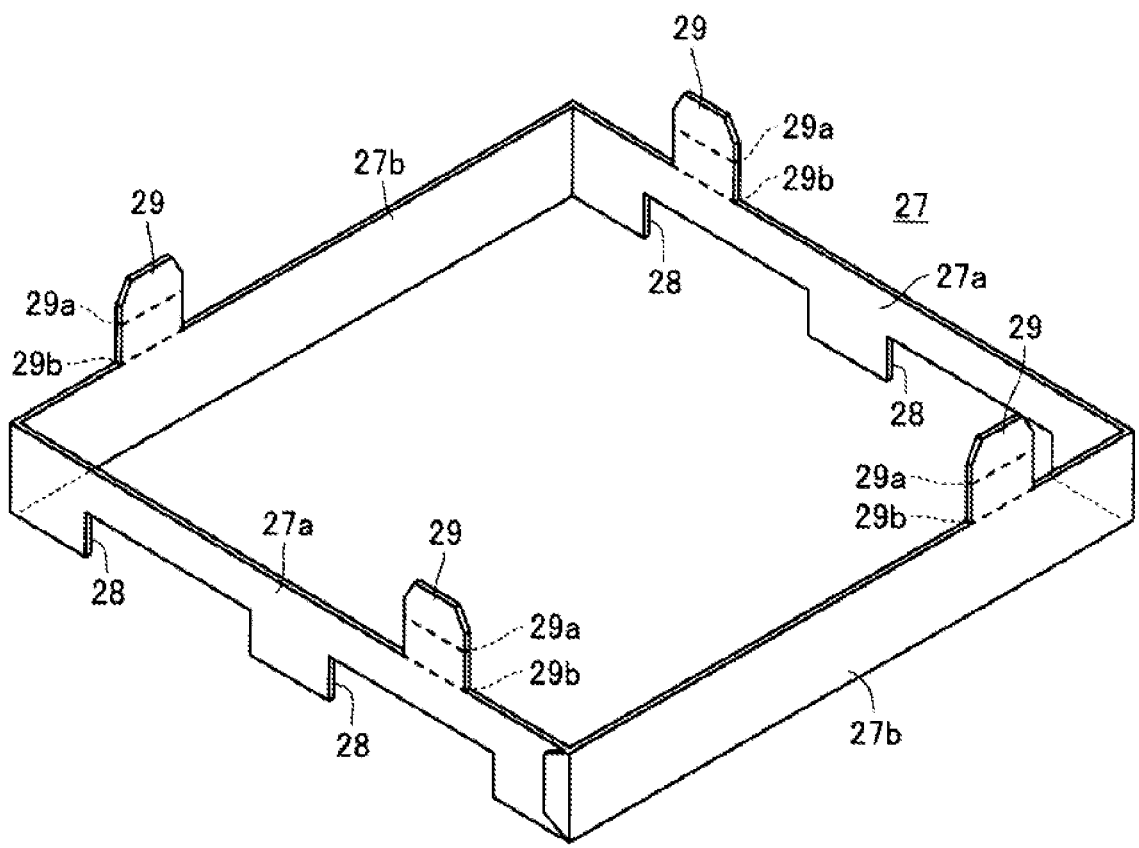
FIG. 15 is a perspective view of an outer frame of Embodiment 6 used to restrict the pallet body from the outside.

FIG. 15 shows a corrugated cardboard outer frame 27 as the holding means for restricting the expanded pallet body 4 from the outside. The outer frame 27 is a frame that is square in plan view with each side of 110 cm×110 cm so as to correspond to the pallet body 4 substantially square in plan view having a size of approximately 110 cm×110 cm. The vertical width is matched with the vertical width (1 unit) of the pallet body 4. Cut portions 28 arranged at positions of the cut portions 11 for the passages 6 of the base plate bodies 7A, 7B, 8A to 8D are formed on the lower side of a pair of opposing first frames 27*a* of the outer frame 27.

An overhanging piece 29 serving as both the holding means and the engagement portion is formed on the upper edges of frames 27*a*, 27*b* in four directions of the first frames 27*a* and second frames 27*b* orthogonal to the first frames 27*a*. Each overhanging piece 29 is arranged at a rotationally symmetrical position on the upper edge of each frame 27*a*, 27*b*, and the lateral width of the overhanging piece 29 is configured to be matched with the length of the diagonal line of the quadrilateral region S. The overhanging piece 29 is formed with two folds (an upper fold 29*a* and a lower fold 29*b*).

Figure 16A:
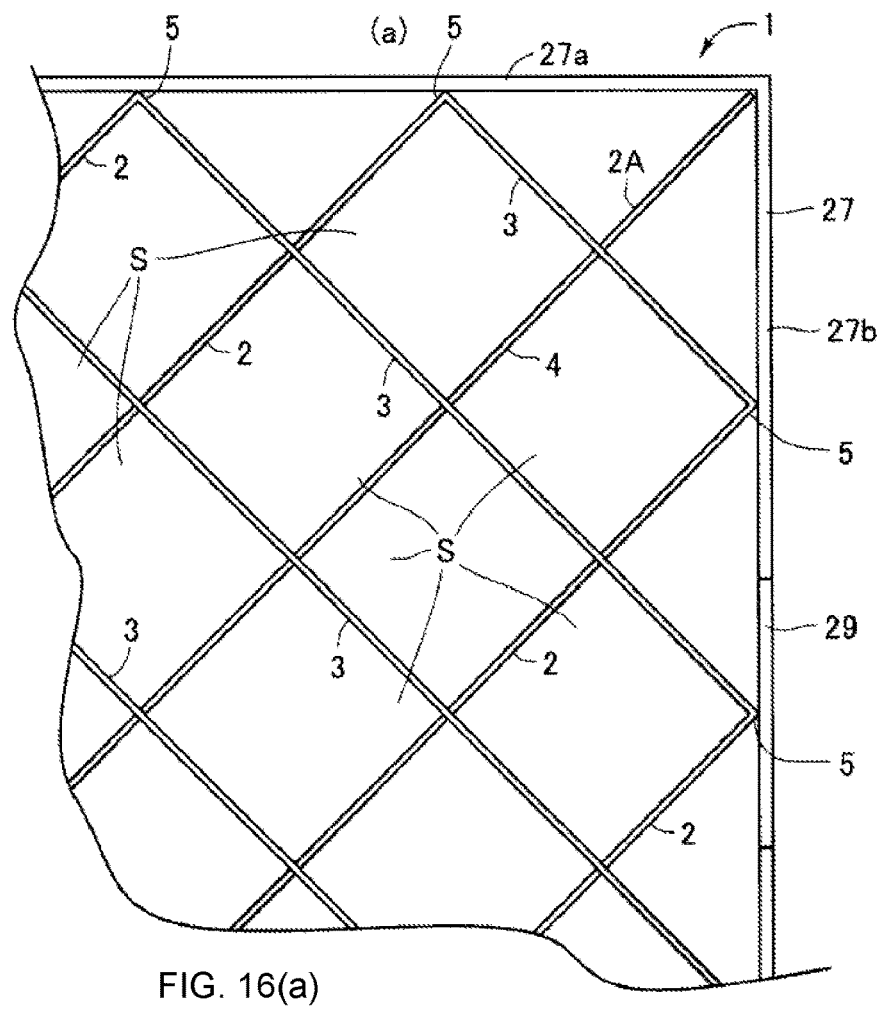
FIG. 16(a) is an explanatory diagram before use and FIG. 16(b) is an explanatory diagram in a use state, for explaining a method of using the outer frame of Embodiment 6.
Figure 16B:
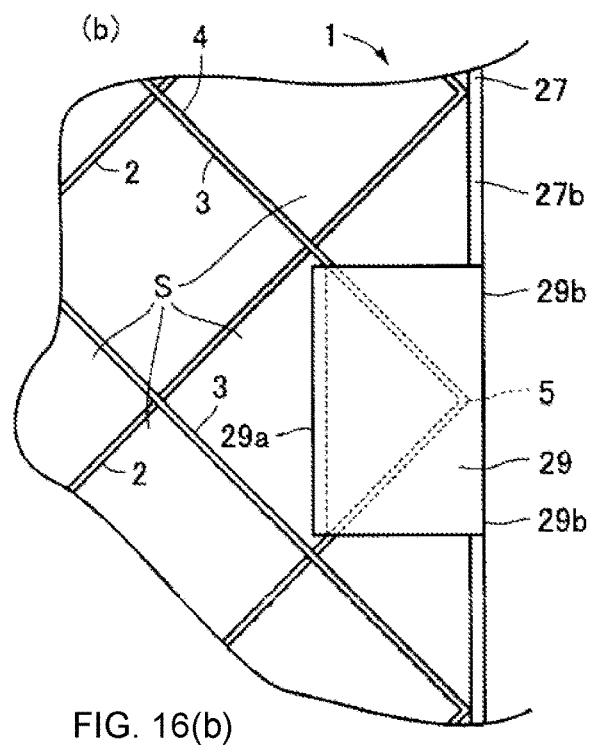

Such an outer frame 27 is used by being attached to the outer periphery of the expanded pallet body 4 so that the cut portions 11, 28 are aligned with each other and by bending the overhanging pieces 29 inward to prevent the outer frame 27 from falling off from the pallet body 4. The overhanging piece 29 is used as follows: As shown in FIG. 16(*a*), with the outer frame 27 attached to the pallet body 4, the overhanging piece 29 is arranged adjacent to a quadrilateral region S1 having the second outward-facing corner portion 5 from the corner of the outer frame 27. As shown in FIG. 16(*b*), two places of the upper fold 29*a* and the lower fold 29*b* are folded, the distal end side (ahead of the upper fold 29*a*) is inserted into the quadrilateral region S1 along the diagonal line of the quadrilateral region S1 and a portion nearer to the base portion than the lower fold 29*b* is placed on the quadrilateral region S1.

When such a holding means is used, the outer frame 27 surrounds the square outer shape of the pallet body 4 from the outside to stabilize the shape, and at the same time, the overhanging piece 29 restricts the length of the diagonal line of the quadrilateral region S1, so that the pallet body 4 is held without being deformed. The outer frame 27 itself is also improved in the overall strength because each frame 27*a*, 27*b* is integrated with the pallet body 4 by the overhanging piece 29.

Embodiment 7

Figure 17A:
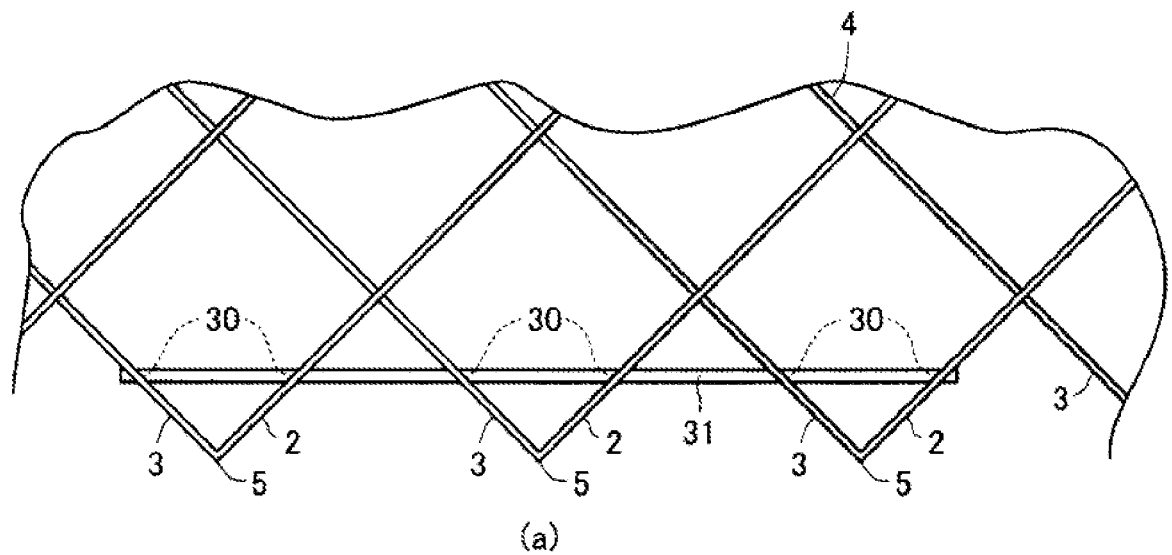
FIG. 17(a) is a plan view and FIG. 17(b) is a front view of a state in which a rod body 31 is inserted into a row of four corner portions formed closest to the outside of the pallet body in the expanded state in Embodiment 7.
Figure 17B:
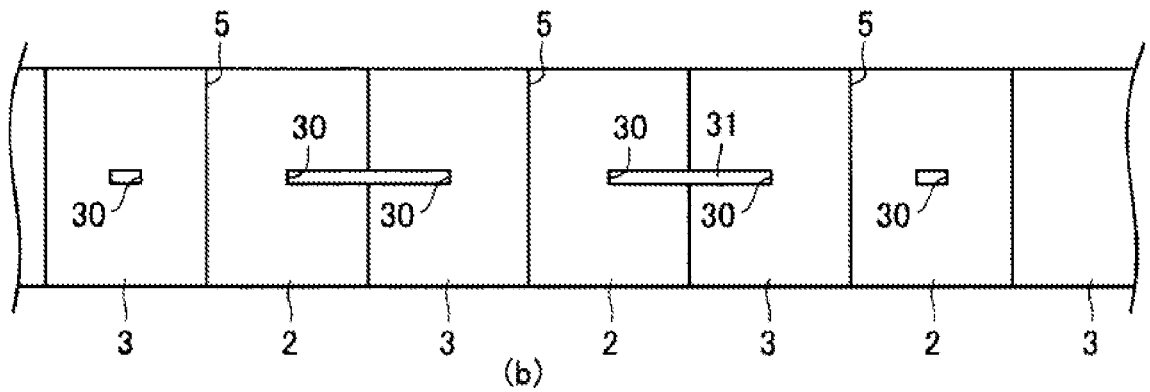

As shown in FIG. 17, small through holes 30 arranged linearly in a state in which the pallet body 4 is correctly expanded are formed with respect to the row of four corner portions 5 in which the distal ends of the outermost first plate bodies 2 and second plate bodies 3 of the pallet body 4 are joined at an angle of 90 degrees. Here, an example of forming a total of six small through holes 30 with respect to three adjacent corner portions 5 is shown. A rod body 31 as a fixing member almost matching the shape of the small through holes 30 is inserted into the small through holes 30. The holding means is a combination of the small through holes 30 and the rod body 31.

With this configuration, even if a force to change the angle of the pallet body 4 acts, the rod body 31 interferes with the edges of the small through holes 30. Thus, the pallet body 4 can be held without being deformed while maintaining the square outer shape.

Embodiment 8

Figure 18:
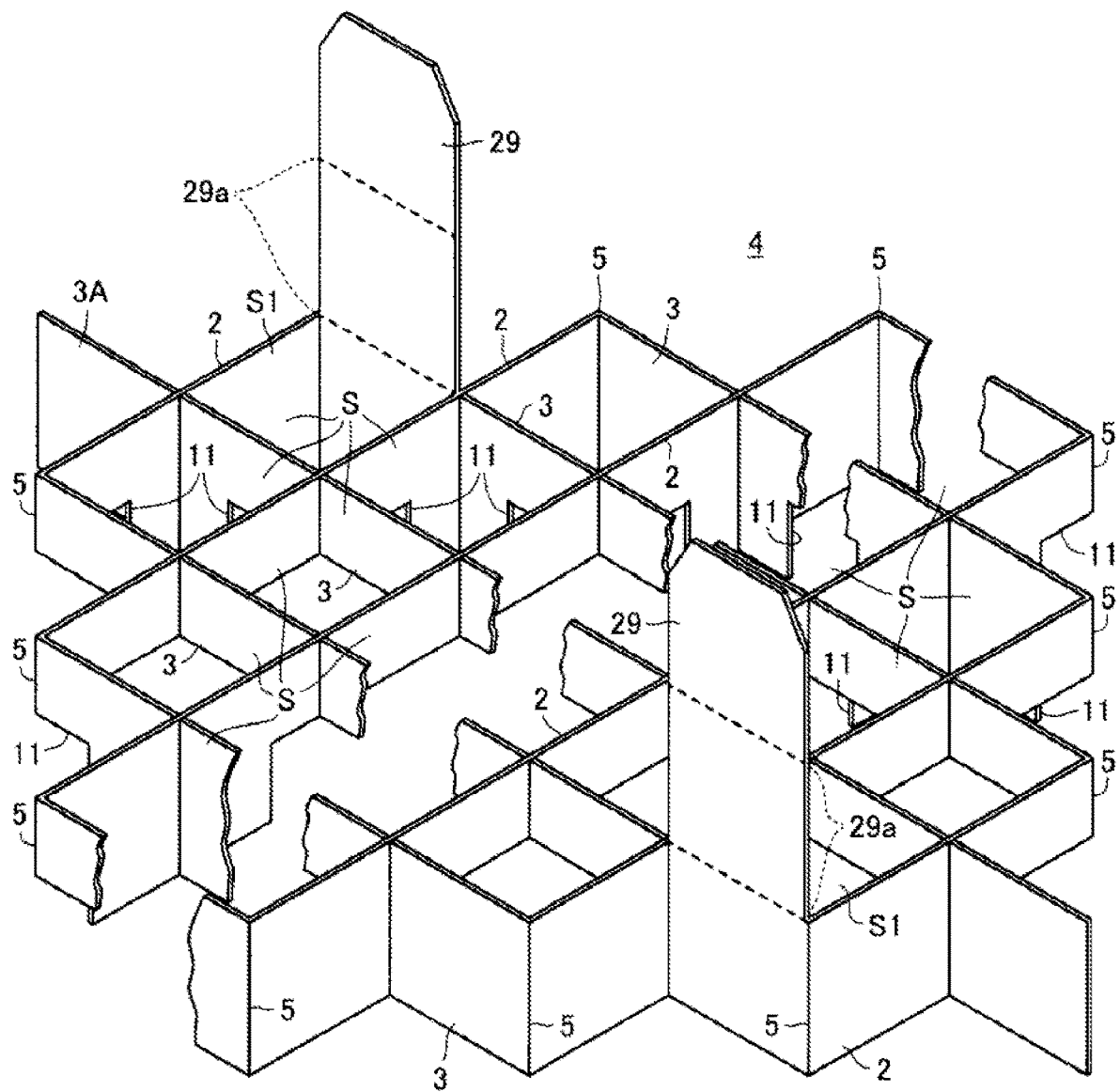
FIG. 18 is a partially omitted perspective view of a pallet body provided with projection pieces of Embodiment 8.

As shown in FIG. 18, the pallet body 4 is formed with projection pieces 33 integrally with the second plate bodies 3, on the second plate bodies 3 at two places, which are positions parallel and separated, in a direction orthogonal to a direction along which the first plate bodies 2 and the second plate bodies 3 extend in a plate shape (in the vertical direction when the pallet body 4 is installed on a horizontal ground surface). In other words, the projection pieces 33 are provided to the second base plate body 8A, which is the precursor of the second plate body 3. The projection pieces 33 are used by being inserted into adjacent quadrilateral regions S1. The width of the projection pieces 33 is matched with the width of the adjacent quadrilateral regions S1.

Figure 19C:
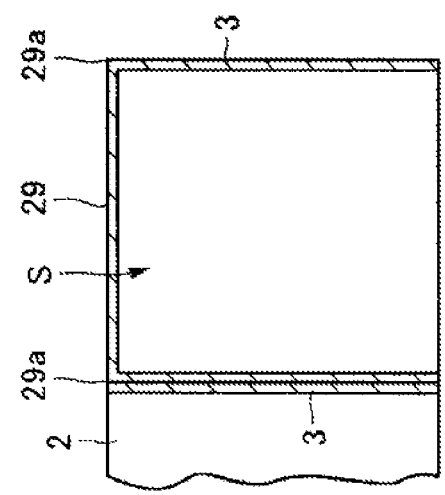
FIG. 19(c) is a partially enlarged cross sectional view of a use state, for explaining a method of using the projection pieces of Embodiment 8.
Figure 19B:
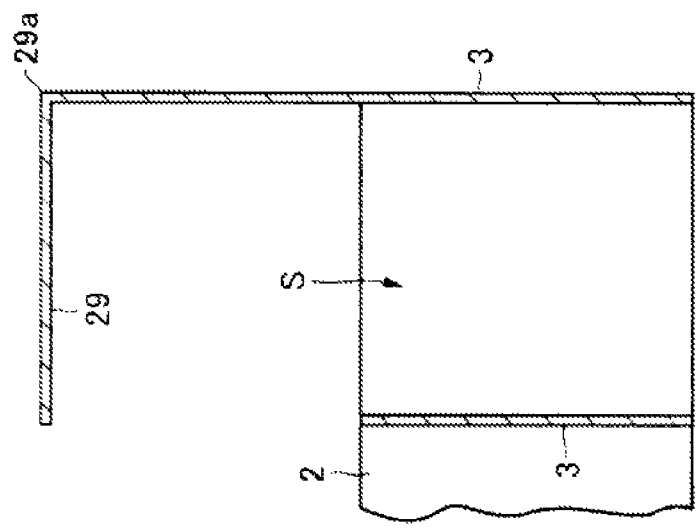
FIG. 19(b) is a partially enlarged cross sectional view of a state in which an upper half of the projection piece is bent.
Figure 19A:
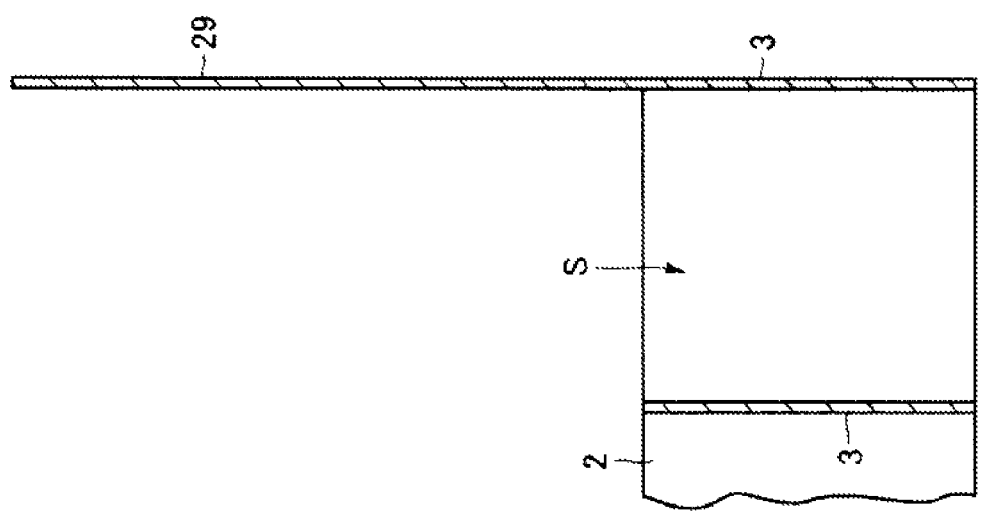
FIG. 19(a) is a partially enlarged cross sectional view of the state of FIG. 18.

Such a holding means (projection piece 33) is, first, from the state in which the projection piece 33 is erected as in FIG. 18 and FIG. 19(*a*), folded at two folds 33*a* and the distal end side is inserted into the quadrilateral region S1 as in, for example, FIG. 19(*b*) and FIG. 19(*c*).

When such a holding means is used, the projection pieces 33 can hold the pallet body 4 with the pallet body 4 expanded. Further, the projection piece 33 is a part of the second plate body 3 constituting the pallet body 4, so that there is no need to prepare a separate holding means.

The foregoing embodiments are merely described as specific embodiments for illustrating the principles and concepts of the present invention. That is, the present invention should not be limited to the foregoing embodiments. The present invention can also be embodied in modified forms, for example, as follows:

The shape and size of the pallet body 4 are examples in the above. Further, for the material, for example, a laminated plate material in which paper is laminated and reinforced with an adhesive, plastic, or light metal such as aluminum alloy can also be used other than corrugated cardboard.

The example in which the pallet body 4 assumes a substantially square outer shape when expanded is illustrated in the above. However, the outer shape may be substantially rectangular or substantially rhombic as long as it can be expanded and folded. Further, the shapes of the first base plate bodies 7A, 7B and the second base plate bodies 8A to 8D, which become the first plate bodies 2 and the second plate bodies 3, and the patterns, the assembling method, and the like of the frame bodies F1 and the frame bodies F2 can be modified and implemented.

Embodiments 1 to 7 as the holding means are examples, and the present invention should not be limited thereto. The means of Embodiments 1 to 7 may be arbitrarily combined in use.

The box 15 of Embodiment 1 may be formed in a quadrilateral tubular shape removing the top lid 16b and the bottom lid 16c.

The number and arrangement positions of the overhanging pieces 29 of Embodiment 6 may be changed as appropriate.

In Embodiment 8, the two projection pieces 33 are formed on the second plate body 3 side. However, both or either one of them may be formed on the first plate body 2 side. Further, the number of the projection pieces 33 does not have to be two. Since the deformation of the shape of the quadrilateral region S1 is restricted as long as the projection piece 33 can be inserted into the quadrilateral region S1 as a use method, especially the insertion method does not have to be in the form of a lid as in FIG. 19(c).

The cut portions 11 for the passages 6 on the back side of the pallet body 4 may be omitted. Further, the shape of the cut portions 11 should not be limited to the above. The passages 6 are formed in the shape of a notch in the foregoing embodiment but may be in the shape of a hole.

The present invention is not limited to the configurations described in the embodiments described above. Components of the above-described embodiments and modifications may be arbitrarily selected and combined to make a configuration. Arbitrary components of the embodiments and modifications and arbitrary components described in "Solution to Problem" or components embodying arbitrary components described in "Solution to Problem" may be arbitrarily combined to make a configuration. The applicant also has an intention to acquire rights to these in the amendment or divisional application, etc., of the present application.

In addition, the applicant has an intention to acquire rights for the whole design or a partial design by applying for a change to a design application. Although the drawings illustrate the whole of the apparatus of the present invention with solid lines, the drawings include not only the whole design but also a partial design claimed for a part of the apparatus. For example, the drawings include not only a part of members of the apparatus as a partial design, but also a part of the apparatus as a partial design regardless of the members. A part of the apparatus may be a part of the members of the apparatus or a part of the member.

REFERENCE SIGNS LIST

1 . . . Pallet, 2 . . . First plate body, 3 . . . Second plate body, 4 . . . Pallet body, 15 . . . Box as holding means, 15 . . . Box as holding means, 15 . . . Box as holding means, 18, 21 . . . Cross plate as holding means, 25 . . . Piece as holding means, 27 . . . Outer frame as holding means, 29 . . . Overhanging piece as holding means, 30 . . . Small through hole as holding means, 31 . . . Rod body as holding means, 33 . . . Projection piece as holding means

The invention claimed is:

1. An article transportation pallet comprising:
a foldable pallet body having a first surface structure in which a plurality of first plate bodies formed in a strip shape are arranged so as to be parallel to each other in a plane direction and a second surface structure in which a plurality of second plate bodies formed in a strip shape are arranged so as to be parallel to each other in a plane direction, wherein the plurality of first plate bodies and the plurality of second plate bodies are arranged so that the plurality of second plate bodies intersect with the plurality of first plate bodies to constitute quadrilateral regions, each surrounded by four wall surfaces composed of two of the first plate bodies and two of the second plate bodies, and the first and second plate bodies are rotatably connected at intersection lines formed by engaging slits of the first and second plate bodies, and
a holding means configured to hold the pallet body in an expanded state.

2. The article transportation pallet according to claim 1, wherein the pallet body assumes a substantially quadrilateral or substantially rhombic outer shape in the expanded state, and a row of corner portions into which outer ends of the first plate bodies and the second plate bodies are integrated is formed on each outer edge in four directions around the pallet body.

3. The article transportation pallet according to claim 1, wherein the holding means is a box member that is arranged in the quadrilateral region and is in contact with opposing surfaces of the wall surfaces constituting the quadrilateral region.

4. The article transportation pallet according to claim 1, wherein the holding means is a plate body that is arranged in the quadrilateral region and arranged in a cross shape with distal ends abutting against corners inside the quadrilateral region.

5. The article transportation pallet according to claim 1, wherein the holding means is a frame member that surrounds the pallet body while being in contact with an outer periphery of the pallet body when the pallet body is in the expanded state.

6. The article transportation pallet according to claim 1, wherein the holding means is formed with an engagement portion that is engaged with an upper end of the pallet body when attached to the pallet body.

7. The article transportation pallet according to claim 1, further comprising a fixing member fixing the holding means to the pallet body so that the holding means does not fall off when the pallet body is lifted up.

8. The article transportation pallet according to claim 1, wherein the holding means is a projection piece integrally formed with a part of at least one of the first plate bodies and the second plate bodies constituting the pallet body.

9. The article transportation pallet according to claim 1, wherein angles formed by the first plate bodies and the second plate bodies when held by the holding means are a right angle.

10. The article transportation pallet according to claim 1, wherein the slits are half the length of the full width of the first plate bodies and the second plate bodies.

11. The article transportation pallet according to claim 1, wherein upper ends of the first and second plate bodies are flush with each other.

12. The article transportation pallet according to claim 1, wherein the pallet body is formed with holes or notches for inserting a fork of a forklift.

13. The article transportation pallet according to claim 1, wherein the pallet body is made of any of paper, plastic, or aluminum alloy.

* * * * *